United States Patent
Haddad et al.

(10) Patent No.: US 9,565,359 B2
(45) Date of Patent: *Feb. 7, 2017

(54) INTERNAL SIGNAL DIVERSION WITH CAMERA SHUTTERING FOR MOBILE COMMUNICATION DEVICES

(71) Applicant: Vysk Communications, Inc., San Antonio, TX (US)

(72) Inventors: Waleed Sami Haddad, San Francisco, CA (US); Victor E. Cocchia, San Antonio, TX (US)

(73) Assignee: VYSK COMMUNICATIONS, INC., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/558,105

(22) Filed: Dec. 2, 2014

(65) Prior Publication Data

US 2015/0288882 A1    Oct. 8, 2015

Related U.S. Application Data

(63) Continuation of application No. 14/248,329, filed on Apr. 8, 2014, now Pat. No. 8,902,318.

(51) Int. Cl.
*H04N 5/225* (2006.01)
*H04N 5/232* (2006.01)

(52) U.S. Cl.
CPC ........ *H04N 5/23245* (2013.01); *H04N 5/2252* (2013.01); *H04N 5/2254* (2013.01);
(Continued)

(58) Field of Classification Search
CPC ............ H04N 5/23245; H04N 5/23293; H04N 5/23206; H04N 5/2252; H04N 5/2258; H04N 5/2254; G06F 21/50; H04W 12/10
(Continued)

(56) References Cited

U.S. PATENT DOCUMENTS

| 7,581,893 B2 | 9/2009 | Miramontes |
| 8,367,235 B2 | 2/2013 | Huang |

(Continued)

FOREIGN PATENT DOCUMENTS

| WO | WO2004112364 | 12/2004 |
| WO | WO2011150875 | 12/2011 |

OTHER PUBLICATIONS

International Search Report and Written Opinion dated Jul. 22, 2015 from PCT Application No. PCT/US2015/024607, 11 pages.

(Continued)

*Primary Examiner* — Timothy J Henn
(74) *Attorney, Agent, or Firm* — Workman Nydegger

(57) ABSTRACT

A mobile communications device includes a display, one or more sources comprising at least one microphone and at least one camera, a wireless communications module, a main processor, and a secured processor inaccessible by the main processor. A housing supports components of the device and is configured for hand-held manipulation. A shutter is supported by the housing, and comprises a lens shutter situated within the housing and configured to obscure a lens of the at least one camera when activated. A user actuatable switch is coupled to at least the one or more sources, the main processor, the secured processor, and the shutter. The switch is configured to selectively activate and deactivate the lens shutter. The switch is also configured to divert signals produced by the sources away from the main processor when activated, and couple signals produced by the sources to the main processor when deactivated.

20 Claims, 18 Drawing Sheets

(52) U.S. Cl.
CPC ....... *H04N 5/2258* (2013.01); *H04N 5/23206* (2013.01); *H04N 5/23293* (2013.01)

(58) Field of Classification Search
USPC .......................................... 726/1, 2, 26–30
See application file for complete search history.

(56) References Cited

U.S. PATENT DOCUMENTS

| | | | |
|---|---|---|---|
| 8,496,390 | B2 | 7/2013 | Ohuchi et al. |
| 8,522,309 | B2 | 8/2013 | Yoffe et al. |
| 8,902,318 | B1 * | 12/2014 | Haddad .............. H04N 5/23245 348/207.1 |
| 9,147,068 | B1 * | 9/2015 | Haddad .................. G06F 21/50 |
| 2005/0052567 | A1 | 3/2005 | Huang et al. |
| 2006/0020826 | A1 | 1/2006 | Felton et al. |
| 2006/0069756 | A1 | 3/2006 | Singh et al. |
| 2009/0111517 | A1 | 4/2009 | Chen |
| 2010/0293543 | A1 | 11/2010 | Erhart et al. |
| 2011/0058255 | A1 | 3/2011 | Weiss |
| 2011/0172822 | A1 | 7/2011 | Ziegler et al. |
| 2012/0120186 | A1 * | 5/2012 | Diaz .................... H04N 5/2258 348/36 |
| 2012/0157165 | A1 | 6/2012 | Kim et al. |
| 2012/0257098 | A1 | 10/2012 | Rajagopal et al. |
| 2012/0282977 | A1 | 11/2012 | Haleluk |
| 2013/0002725 | A1 | 1/2013 | Kim et al. |
| 2013/0222609 | A1 | 8/2013 | Soffer |
| 2013/0232238 | A1 | 9/2013 | Cohn et al. |
| 2013/0246268 | A1 | 9/2013 | Moshfeghi |
| 2014/0015987 | A1 | 1/2014 | Harple et al. |

OTHER PUBLICATIONS

U.S. Appl. No. 14/248,329.
U.S. Appl. No. 14/248,326.

* cited by examiner

INTERNAL SIGNAL DIVERSION WITH CAMERA SHUTTERING FOR MOBILE COMMUNICATION DEVICES

RELATED APPLICATIONS

This application is a continuation of U.S. patent application Ser. No. 14/248,329, filed Apr. 8, 2014, now U.S. Pat. No. 8,902,318, to which priority is claimed pursuant to 35 U.S.C. §119(e) and which is hereby incorporated herein by reference.

SUMMARY

Embodiments are directed to an apparatus and method for providing secured communications between a communication device and remote entities. Embodiments are directed to an apparatus and method for providing secured communications between a mobile communication device and remote entities while operating in one or more privacy modes selectable by a user of the device. According to some embodiments, a mobile communications device includes a display, one or more sources comprising at least one microphone and at least one camera, a wireless communications module, and a main processor. The device also includes a secured processor inaccessible by the main processor. A housing of the device is configured for hand-held manipulation and to support the display, the one or more sources, the communications module, the main processor, and the secured processor. A shutter is supported by the housing, and comprises a lens shutter situated within the housing and configured to obscure a lens of the at least one camera when activated. A switch is actuatable by a user of the device and coupled to at least the one or more sources, the main processor, the secured processor, and the shutter. The switch is configured to selectively activate and deactivate the lens shutter. The switch is also configured to divert signals produced by the sources away from the main processor when activated, and couple signals produced by the sources to the main processor when deactivated.

In accordance with other embodiments, a mobile communications device includes a display, a plurality of sources comprising at least one microphone and at least one camera, a wireless communications module, and a main processor. A housing is configured for hand-held manipulation and to support the display, sources, communications module, and main processor. A shutter is supported by the housing and comprises a lens shutter situated within the housing and configured to obscure a lens of the at least one camera when activated. A switch is actuatable by a user of the device and coupled to at least the sources, main processor, and the shutter. The switch is configured to selectively activate and deactivate the lens shutter. The switch is also configured to divert signals produced by the sources away from the main processor when activated, and couple signals produced by the sources to the main processor when deactivated.

According to further embodiments, a method involves respectively generating an activation signal and a deactivation signal in response to user activation and deactivation of a switch of a mobile communication device. The device comprises a display, a plurality of sources comprising at least one microphone and at least one camera, a wireless communications module, a main processor, and a shutter comprising a lens shutter situated within a housing of the device and configured to obscure a lens of the at least one camera when activated. The method also involves selectively activating and deactivating the lens shutter. The method further involves diverting signals produced by the sources away from the main processor in response to activation of the switch, and diverting signals produced by the sources back to the main processor in response to deactivation of the switch.

The above summary is not intended to describe each disclosed embodiment or every implementation of the present disclosure. The Figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The Figures are not necessarily to scale. Like numbers used in the Figures refer to like components. However, it will be understood that the use of a number to refer to a component in a given Figure is not intended to limit the component in another Figure labeled with the same number.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Embodiments of the disclosure are directed to an apparatus and method for providing enhanced privacy for mobile communication devices. Embodiments are directed to an apparatus and method of ensuring privacy of conversations, and text, data, and video exchanges between mobile communication devices and remote entities via a network. Embodiments are directed to an apparatus and method for preventing surreptitious access by remote entities to voice, text, data, video, and other information generated or received by a mobile communication device. Embodiments are directed to an apparatus and method for preventing surreptitious access by remote entities to specified components and transmission paths within a mobile communication device. Embodiments of the disclosure provide for shuttering of one or more cameras of the device, exclusive of or in combination with camera signal diversion. Shuttering one or more cameras of a mobile communication device provides a clearly perceivable indication of complete privacy against unintended capturing of video and photographs, and surreptitious access to such captured images by a remote entity.

Figure 1:
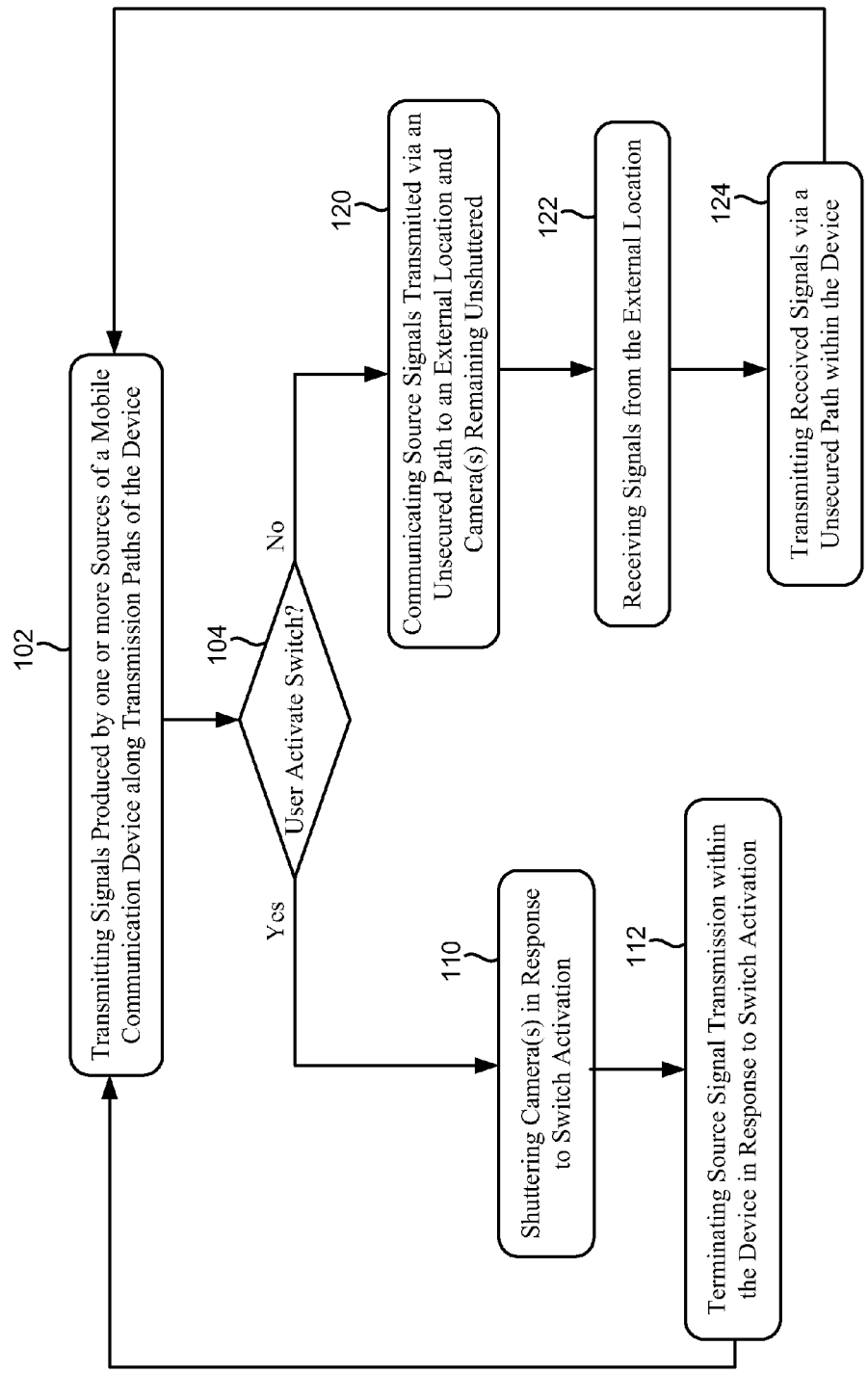
FIG. 1 illustrates an embodiment of a secured communications methodology in accordance with various embodiments.

FIG. 1 illustrates an embodiment of a secured communications methodology in accordance with various embodiments. According to FIG. 1, a secured communications method involves transmitting 102 signals produced by one or more sources of a mobile communication device along transmission paths within the device and/or via external transmission paths. The one or more sources of the device may include one or more of a microphone, a camera, and various sensors. The method involves determining 104 if a user actuatable switch of the device has been activated by a user of the device. In various embodiments, the switch can be actuated by a user to selectively enable and disable one or more privacy modes of device operation. In response to user activation of the switch, the camera or cameras of the device are shuttered 110, and transmission of signals produced by the one or more sources is terminated 112 within the device according to some embodiments. Depending on the configuration of the mobile communication device, camera shuttering 110 may be implemented alone or in combination with termination 112 of signal transmission by one or more of the device's cameras. For example, low-cost devices may provide for microphone signal diversion (but not camera signal diversion) in combination with camera shuttering. Other components of the device, such as a speaker, an audio output jack, a video output jack, and a data interface jack, for example, may also be terminated within the device. Termination of source signal transmission within the device and shuttering of the device's cameras ensures that signals produced by sources of the mobile communication device are unavailable to other components of the device that may be susceptible to surreptitious access during times in which privacy as desired. The privacy mode of device operation illustrated in FIG. 1 can be enabled during periods of device idleness, such as during a business meeting, where limited operation of the devices is desired.

During times when the switch is not activated 104, the mobile communication device operates in a normal fashion, with the cameras remaining unshuttered and signals produced by sources of the mobile communications device being transmitted 120 via transmission paths within the device that include unsecured transmission paths. Source signals transmitted via the unsecured transmission path are communicated 122 to an external location, such as occurs during normal voice, text and/or video communication between a user of the device and a remote communication device. As part of normal operation of the device, signals can be received 122 from an external location (e.g., via a cellular connection or an external microphone such as by way of a BlueTooth® headset or earpiece), and the received signals are transmitted 124 via transmission paths that include an unsecured path within the device and processed in a normal fashion.

In the context of various embodiments of the disclosure, an unsecured transmission path refers to a communication path, link or channel that is susceptible to surreptitious access by way of hardware and/or software internal or external of the mobile communication device which can be used to intercept signals transmitted within the device or to eavesdrop on the operation of the device. An unsecured transmission path can refer to or include a physical path (e.g., electrical conductor, optical link), a hardware component (e.g., processor, transceiver, memory, input/output interface, radio), a software component (e.g., operating system, application software, firmware, middleware, codecs, drivers), a wireless communication path, link or channel, or any combination of these elements. One illustrative example of an unsecured transmission path within a mobile communication device is a path between the main processor and/or operating system of the device and a microphone or camera of the device. In the absence of enhanced security features provided by embodiments of the present disclosure, signals produced by the microphone or camera (or other sources and sensors of the device) can be surreptitiously accessed by a remote entity via the main processor, the operating system of the device or other device or unsecured point of access.

Figure 2:
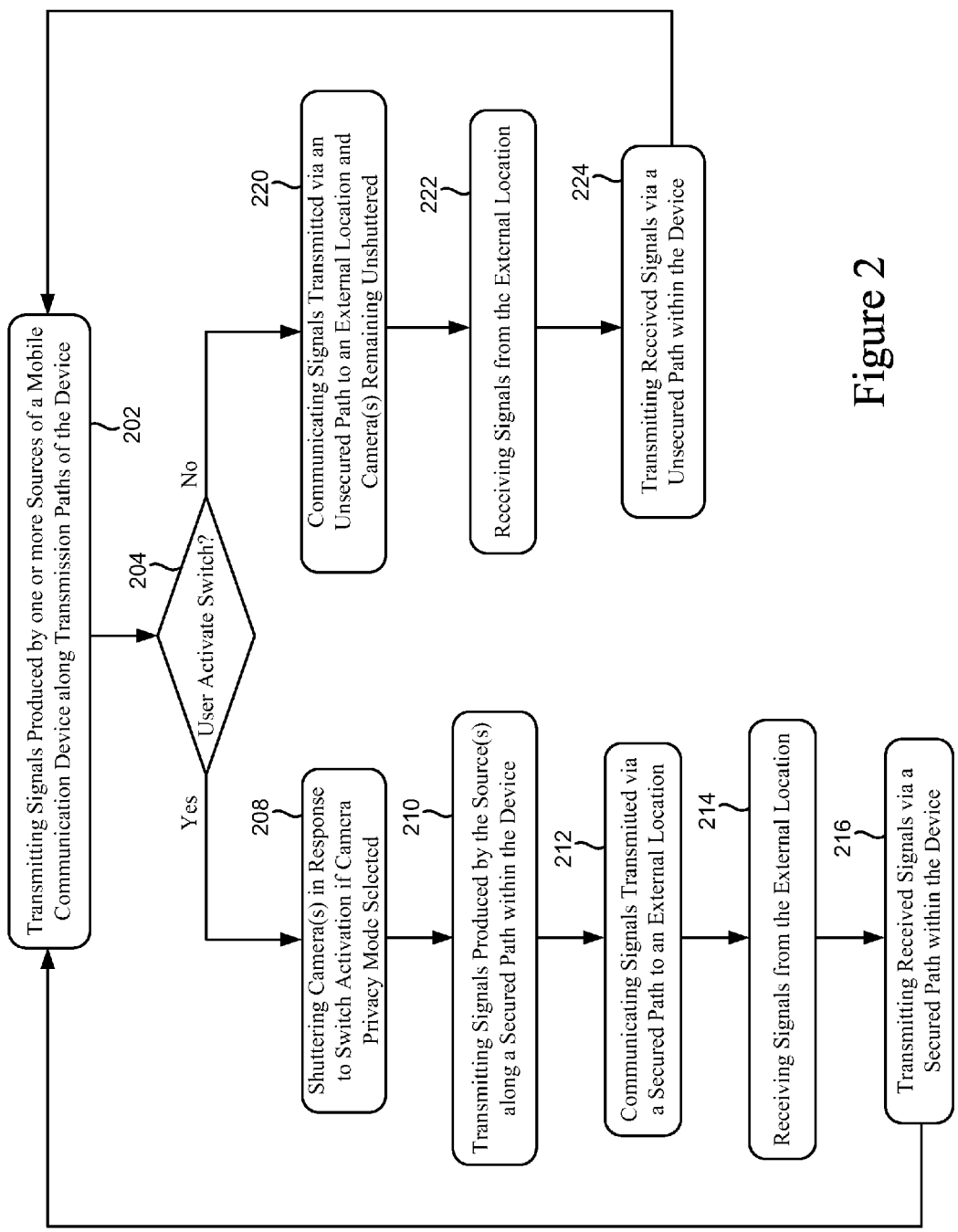
FIG. 2 illustrates an embodiment of a secured communications methodology in accordance with some embodiments.

FIG. 2 illustrates a secured communications methodology in accordance with other embodiments. FIG. 2 illustrates a privacy mode involving active operation of a mobile communication device, such as when a user is having a conversation (e.g., voice only or with video) with another person via a remote device at a remote location. Because active operation of the device generally requires use of one or more sources (e.g., a microphone, a camera), the privacy mode of operation illustrated in FIG. 2 provides for secured communications using secured transmission paths within the device and selective shuttering of the camera or cameras of the device if a camera-privacy mode is selected. A camera-privacy mode allows users to communicate via voice, text or data, but not via the camera(s) which are shuttered. If a camera-privacy mode is not selected, the camera(s) remain unshuttered.

In accordance with the methodology illustrated in FIG. 2, secured communications involves transmitting 202 signals produced by one or more sources of a mobile communication device along transmission paths within the device and/or via external transmission paths. The method involves determining 204 if a user actuatable switch of the device has been activated by a user of the device. In response to user selection of a camera-privacy mode via the switch, cameras of the device are shuttered 208 and signals produced by other sources of the device are transmitted 210 along a secured transmission path within the device. In response to user selection of a privacy mode other than the camera-privacy mode via the switch, cameras of the device are unshuttered and signals produced by sources of the device including the camera(s) are transmitted 210 along a secured transmission path within the device. Other components of the device, such as a speaker, an audio output jack, a video output jack, and a data interface jack, may also be coupled to secured transmission paths within the device in response to activation of the switch. The method also involves communicating 212 source signals transmitted via a secured path within the device to an external location and/or to unsecured paths or components of the device.

The method may further involve receiving 214 signals from the external location, and transmitting 216 the received signals via a secured path within the device. The received signals may be transmitted to one or more components of the device, such as a speaker, audio jack, video jack, data jack or a display, for example. Communication of source signals along secured transmission paths within the device and shuttering of the device's cameras if activated ensures that signals produced by sources of the mobile communication device and signals received by the device are unavailable to other components of the device that may be susceptible to surreptitious access during times in which privacy as desired.

When the switch is not activated 204, the mobile communication device operates much in the same way as a typical commercial device (referred to herein as a normal operating mode), with cameras remaining unshuttered and internal signals produced by sources of the device and external signals received by the device communicated along transmission paths that include unsecured transmission paths. For example, source signals can be transmitted via unsecured transmission paths can be communicated 220 to an external location, such as occurs during normal voice, text or video communication between a user of the device and a remote communication device. Signals can be received 222 from an external location, and the received signals can be transmitted 224 via unsecured paths within the device and processed in a normal fashion.

Figure 3:
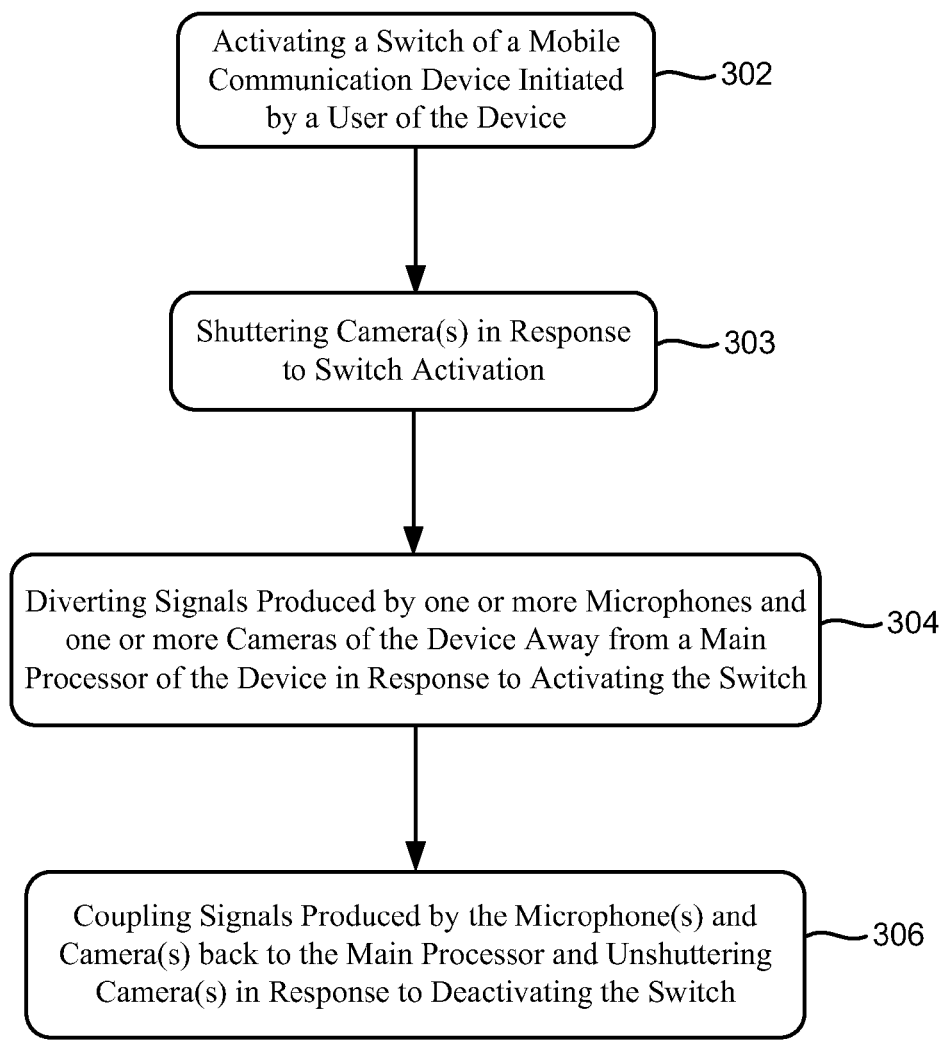
FIG. 3 illustrates an embodiment of a secured communications methodology in accordance with other embodiments.

FIG. 3 illustrates a secured communications methodology in accordance with embodiments involving a mobile communication device which includes one or more microphones and one or more cameras. The method shown in FIG. 3 involves activating 302 a switch of the mobile communication device by the user of the device. Activation of the switch enables a privacy mode of the device. The method involves shuttering 303 one or more (e.g., all) of the cameras of the device. The method also involves diverting 304 signals produced by the microphones, cameras, and optionally other components of the device away from a main processor of the device, which may be susceptible to surreptitious access, in response to activating the switch. In response to deactivating the switch, signals produced by the microphones, cameras, and optionally other components are coupled 306 back to the main processor and the camera(s) are returned to their unshuttered state, allowing the device to resume a normal operating mode.

Figure 4:
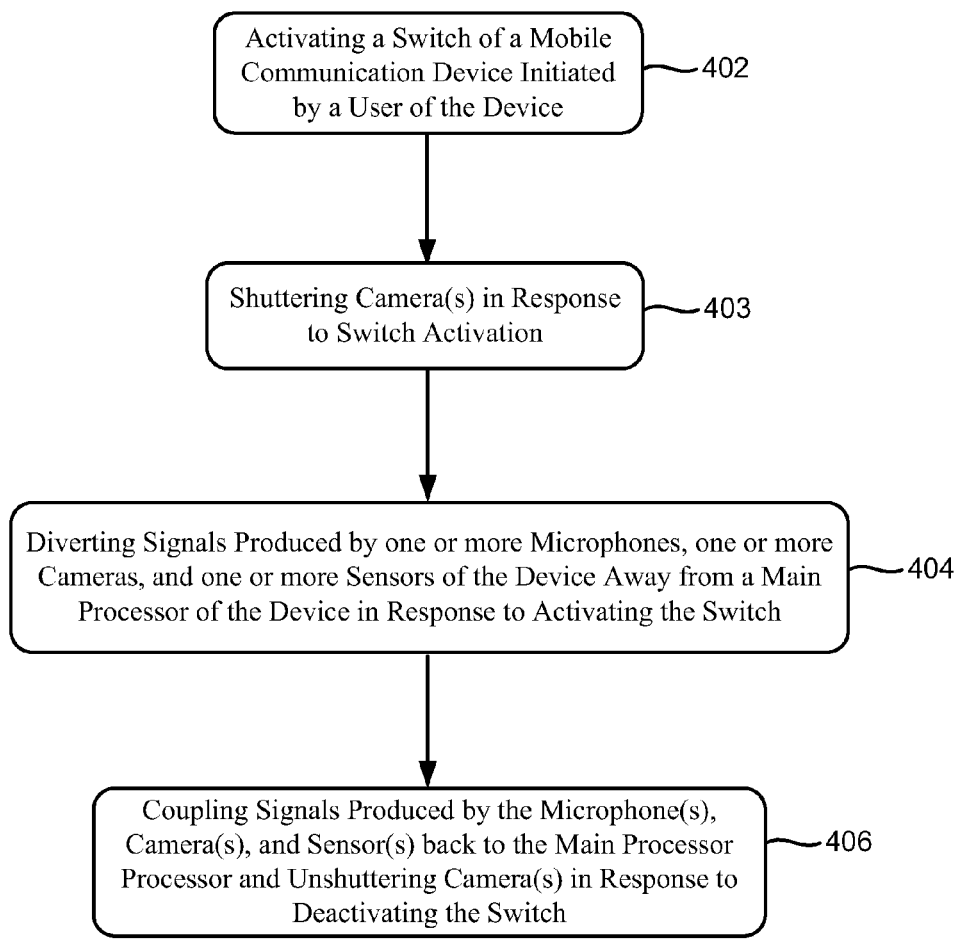
FIG. 4 illustrates an embodiment of a secured communications methodology in accordance with further embodiments.

FIG. 4 illustrates a secured communications methodology in accordance with various embodiments involving a mobile communication device which includes one or more microphones, one or more cameras, and one or more sensors. Representative examples of sensors that can be incorporated in or operated in conjunction with the mobile communication device include a GPS sensor, accelerometer(s), gyroscope(s), magnetometer(s), barometer, thermometer, proximity sensor, ambient light sensor, compass, heart rate sensor, and a pedometer, among others. In some embodiments, the one or more sensors are integral to the mobile communication device, while in other embodiments, the one or more sensors are external of the mobile communication device and are communicatively coupled thereto via a wired or wireless communication link. In further embodiments, a combination of integral and external sensors can be included within a system that includes the mobile indication device.

The method illustrated in FIG. 4 involves activating 402 a switch of the mobile communication device by the user of the device, thereby activating a privacy mode of the device. The method involves shuttering 403 one or more (e.g., all) of the cameras of the device. The method also involves diverting 404 signals produced by the microphones, cameras, sensors (e.g., some or all of the sensors), and optionally other components of the device away from a main processor of the device, which may be susceptible to surreptitious access, in response to activating the switch. In response to deactivating the switch, signals produced by the microphones, cameras, sensors, and optionally other components are coupled 406 back to the main processor and the camera(s) are returned to their unshuttered state, allowing the device to resume a normal operating mode.

Figure 5:
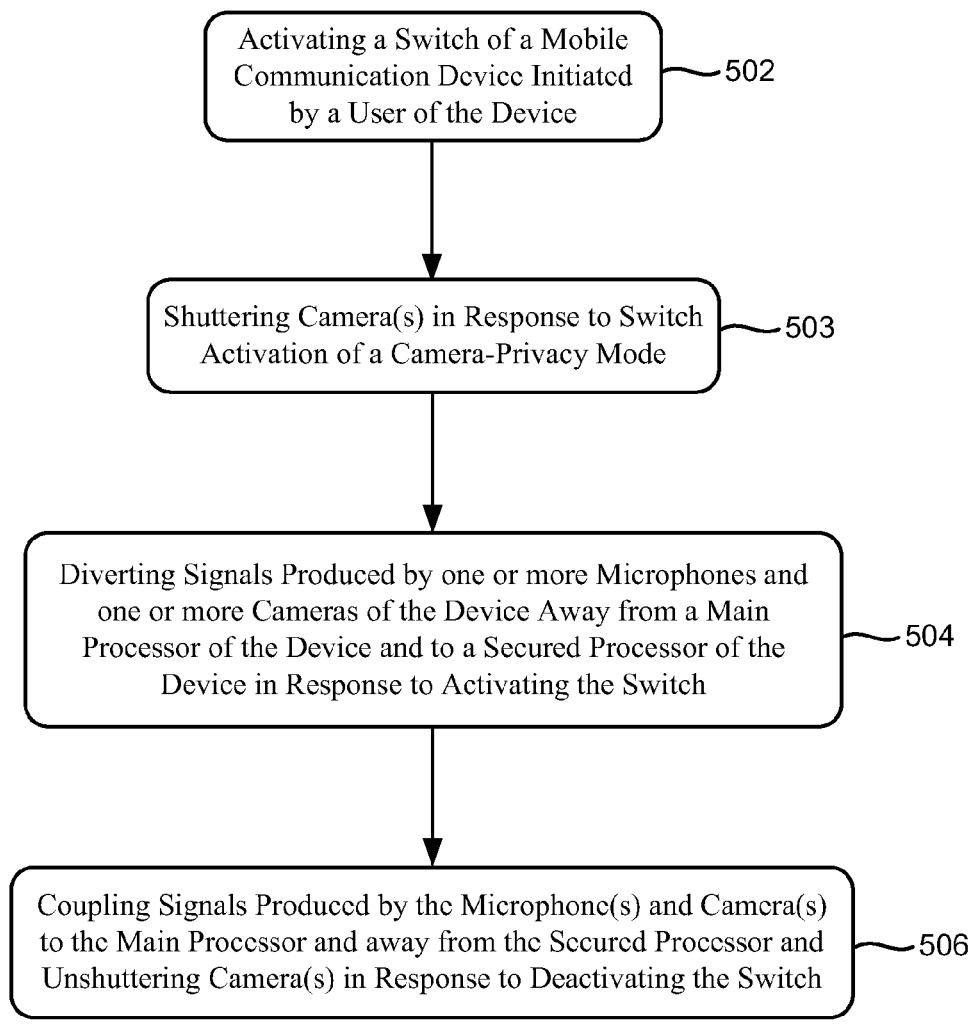
FIG. 5 illustrates an embodiment of a secured communications methodology in accordance with some embodiments.

FIG. 5 illustrates a secured communications methodology in accordance with various embodiments involving a mobile communication device which includes one or more microphones, one or more cameras, and a secured processor. The secured processor can be embodied as one or more of a processor, a controller, or a logic device that is communicatively coupled to one or more secured transmission paths within the mobile communication device. The secured processor typically includes a secured operating system configured for operation independent of the operating system of the main processor of the mobile communication device.

In some embodiments, the secured processor is configured to implement encryption algorithms to encrypt input signals (e.g., voice, text, data, video) in accordance with a predefined encryption protocol. In such embodiments, the secured processor is configured to implement decryption algorithms to decrypt signals received by the secured processor in accordance with a predefined decryption protocol. Representative encryption/decryption algorithms include those suitable for communicating information via a specified data network or networks (e.g., CSD GSM, PSTN, ISDN, UMTS, GPRS, HSDPA). Suitable algorithms that can be implemented by the secured processor include key-based algorithms based on AES and RSA protocols, and possibly other methods, including unique and specialized algorithms.

The method shown in FIG. 5 involves activating 502 a switch of the mobile communication device by the user of the device, thereby enabling a privacy mode of device operation involving the secured processor. The method may involve shuttering 503 one or more (e.g., all) of the cameras of the device and optionally diverting or terminating the camera signals in response to switch activation of a camera-privacy mode. If a camera-privacy mode is not selected, the cameras remain unshuttered. The method also involves diverting 504 signals produced by the microphones and cameras (if unshuttered) of the device away from a main processor of the device, which may be susceptible to surreptitious access, and to the secured processor in response to activating the switch. Other components of the device (e.g., speaker, audio/video/data jacks, display) may optionally be coupled to the secured processor in response to switch activation. In response to deactivating the switch, signals produced by the microphones and cameras (and optionally other components) are coupled 506 back to the main processor and away from the secured processor and the camera(s) are returned to or maintained in their unshuttered state, allowing the device to resume a normal operating mode.

Figure 6:
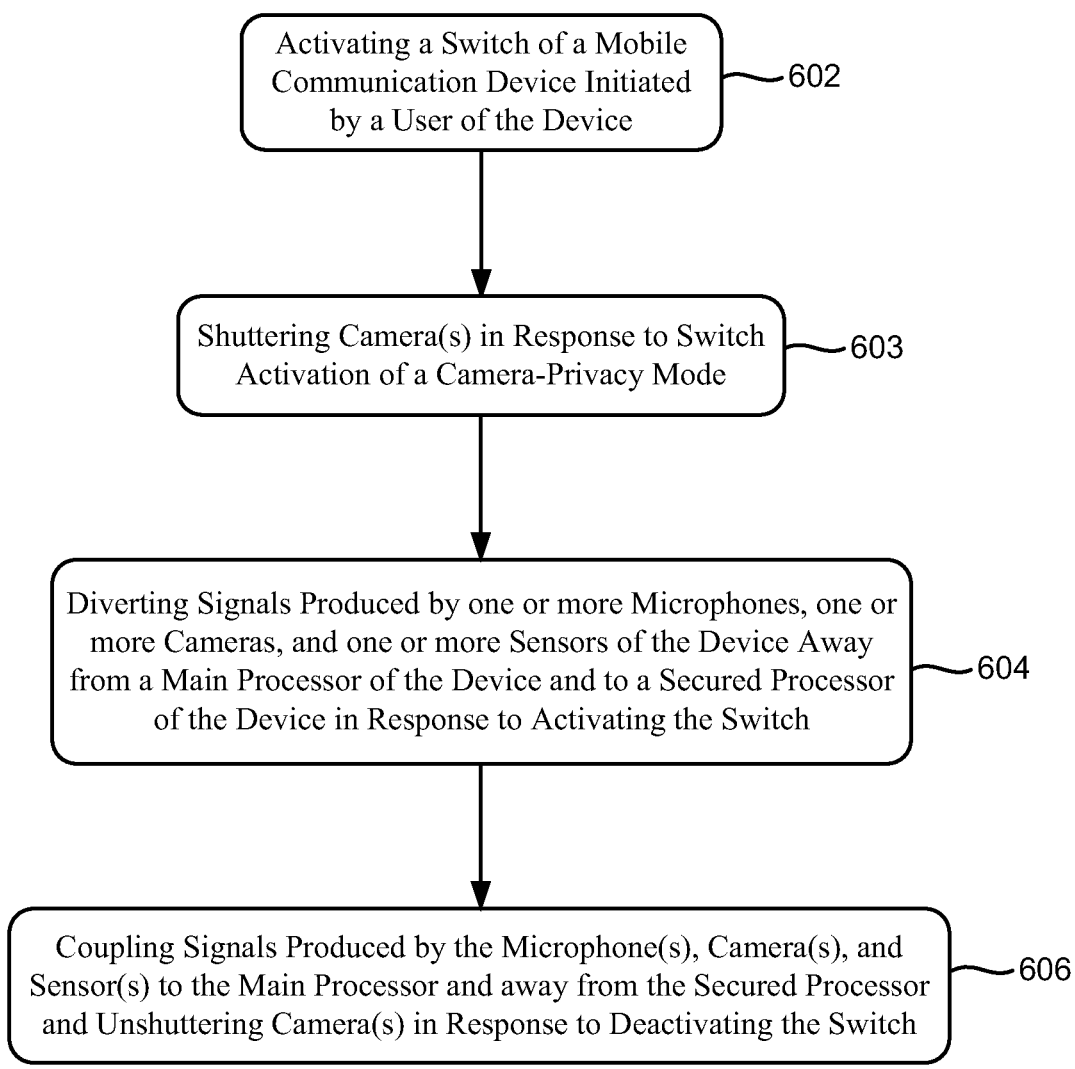
FIG. 6 illustrates an embodiment of a secured communications methodology in accordance with other embodiments.

FIG. 6 illustrates a secured communications methodology in accordance with various embodiments involving a mobile communication device which includes one or more microphones, one or more cameras, one or more sensors, and a secured processor. As previously described, the secured processor can be embodied as one or more of a processor, a controller, or a logic device that is communicatively coupled to one or more secured transmission paths within the mobile communication device. The secured processor includes a secured operating system configured for operation independent of the operating system of the main processor of the mobile communication device, and may be configured to implement encryption and decryption algorithms according to various embodiments. The method shown in FIG. 6 involves activating 602 a switch of the mobile communication device by the user of the device, thereby enabling a privacy mode of device operation involving the secured processor. The method may involve shuttering 603 one or more (e.g., all) of the cameras of the device and optionally diverting or terminating the camera signals in response to switch activation of a camera-privacy mode. If a camera-privacy mode is not selected, the cameras remain unshuttered. The method also involves diverting 604 signals produced by the microphones, cameras, sensors, and optionally other components of the device away from a main processor of the device and to the secured processor in response to activating the switch. In response to deactivating the switch, signals produced by the microphones, cameras, sensors, and optionally other components are coupled 606 back to the main processor and away from the secured processor and the camera(s) are returned to or maintained in their unshuttered state, allowing the device to resume a normal operating mode.

Figure 7:
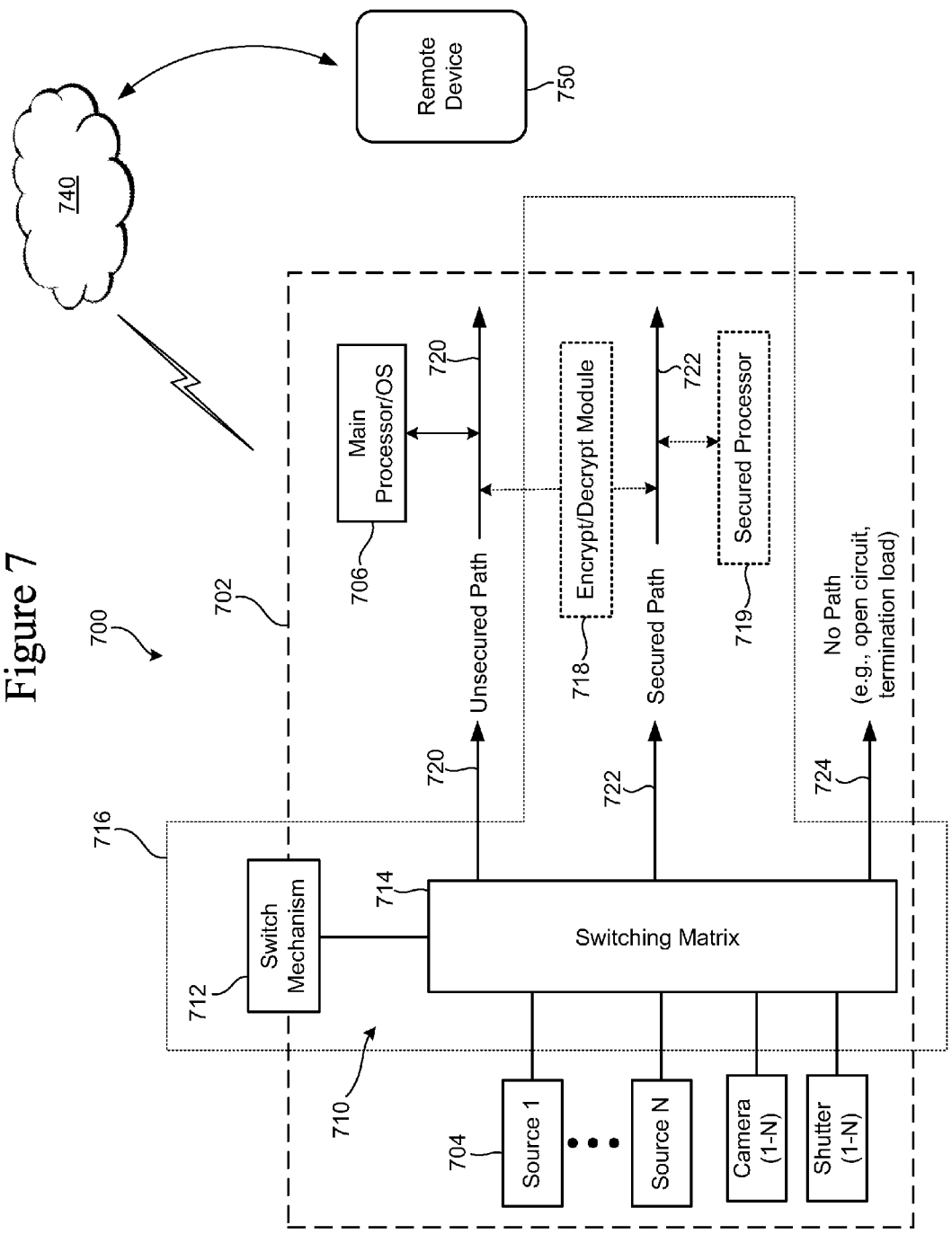
FIG. 7 is a block diagram of a mobile communication device configured to implement a secured communications methodology in accordance with various embodiments.

FIG. 7 is a block diagram of a mobile communication device configured to implement a secured communications methodology in accordance with various embodiments. The mobile communication device 700 shown in FIG. 7 includes a housing 702 configured for hand-held manipulation and to support various components of the device 700. For purposes of simplicity of explanation, FIG. 7 includes selected components of the device 700 that are involved in providing for secured communications in accordance with various embodiments. The device 700 includes a number of sources 704, such as one or more microphones and one or more cameras, coupled to a switch 710. The switch 710 includes a switching matrix 714 which has inputs coupled to the sources 704. Activation and deactivation of the switching matrix 714 is controlled by a switch mechanism 712, which is accessible to the user. The switch mechanism 712 may include a mechanical, electrical, electro-mechanical, electronic, optical, voice-activated or other type of switch that can be activated and deactivated by a user of the device 700.

The switching matrix 714 is configured to controllably switch the sources 704 to one of several transmission paths within the device 700. The sources 704 shown in FIG. 7 include one or more cameras, each of which is equipped with a shuttering arrangement. When activated by the switching matrix 714, each shutter obscures a lens of its corresponding camera. In some implementations, shuttering of the cameras can be perceived as a physical covering or obscuring of the camera lens by a user of the device, thereby visually confirming the shuttered and private state of the cameras. This visual indication of privacy can be important to certain users who are particularly concerned with surreptitious capturing of their images by remote entities, such as celebrities, government employees, politicians, and business leaders for example. In some embodiments, the device 700 includes unsecured transmission paths 720 and secured transmission paths 722, and the switch mechanism 712 is configured to facilitate user initiated switching of the sources 704 between the unsecured transmission paths 720 and secured transmission paths 722. In other embodiments, the device 700 includes unsecured transmission paths 720, secured transmission paths 722, and termination paths 724, and the switch mechanism 712 is configured to facilitate user initiated switching of the sources 704 between the unsecured transmission paths 720, the secured transmission paths 722, and the termination paths 724. The termination paths 724 can be implemented as open circuits or as termination loads.

The block diagram of the device 700 shown in FIG. 7 includes a secured region 716 denoted by a dotted line. Components of the device 700 included within the secured region 716 include the switch 710, secured transmission paths 722, an encryption/decryption module 718, and a secured processor 719. The encryption/decryption module 718 and secured processor 719 are outlined by a dotted line to indicate that these components may be included or excluded depending on the particular design of the device 700. The unsecured transmission paths 720 and termination paths 724 are illustrated as components of the device 700 residing outside of the secured region 716. It is noted that the terminations paths 724 may be included within the secured region 716 in some embodiments. A main processor 706 is coupled to the switching matrix 714 via an unsecured path 720. Because the main processor 706 resides outside of the secured region 716, components and transmission paths within the secured region 716 are inaccessible by the main processor 706. As such, neither the main processor 706 nor devices external to the mobile communication device 700 can surreptitiously access signals transmitted within the secured region 716, including those produced by sources 704.

In the embodiment shown in FIG. 7, source signals transmitted along the secured transmission paths 722 can be encrypted by the encryption/decryption module 718, and transmitted to the main processor 706 or other component of the device 700 via an unsecured transmission path 720. Encryption of source signals and other information communicated along the secured transmission paths 722 ensures that any attempt to access such signals and information via an unsecured transmission path 720 is frustrated due to the encryption. Encrypted signals can be transmitted out of the device 700 via a wireless (or wired) communication interface and to a remote device 750 or other remote entity via a network 740 (e.g., cellular network, landline network, the Internet, and/or private network).

In some embodiments, functions of the encryption/decryption module 718 are implemented by encryption and decryption algorithms executed by the secured processor 719. The secured processor 719 can be configured to coordinate information flow through the secured region 716 and interfacing between components and unsecured transmission paths outside of the secured region 716. It is noted that the secured processor 719, encryption/decryption module 718, or other component that interface with unsecured transmission paths 720 of the device 700 can include firewall hardware and/or software to enhance protection against unintended or malicious access to the secured region 716 of the device 700.

Figure 8:
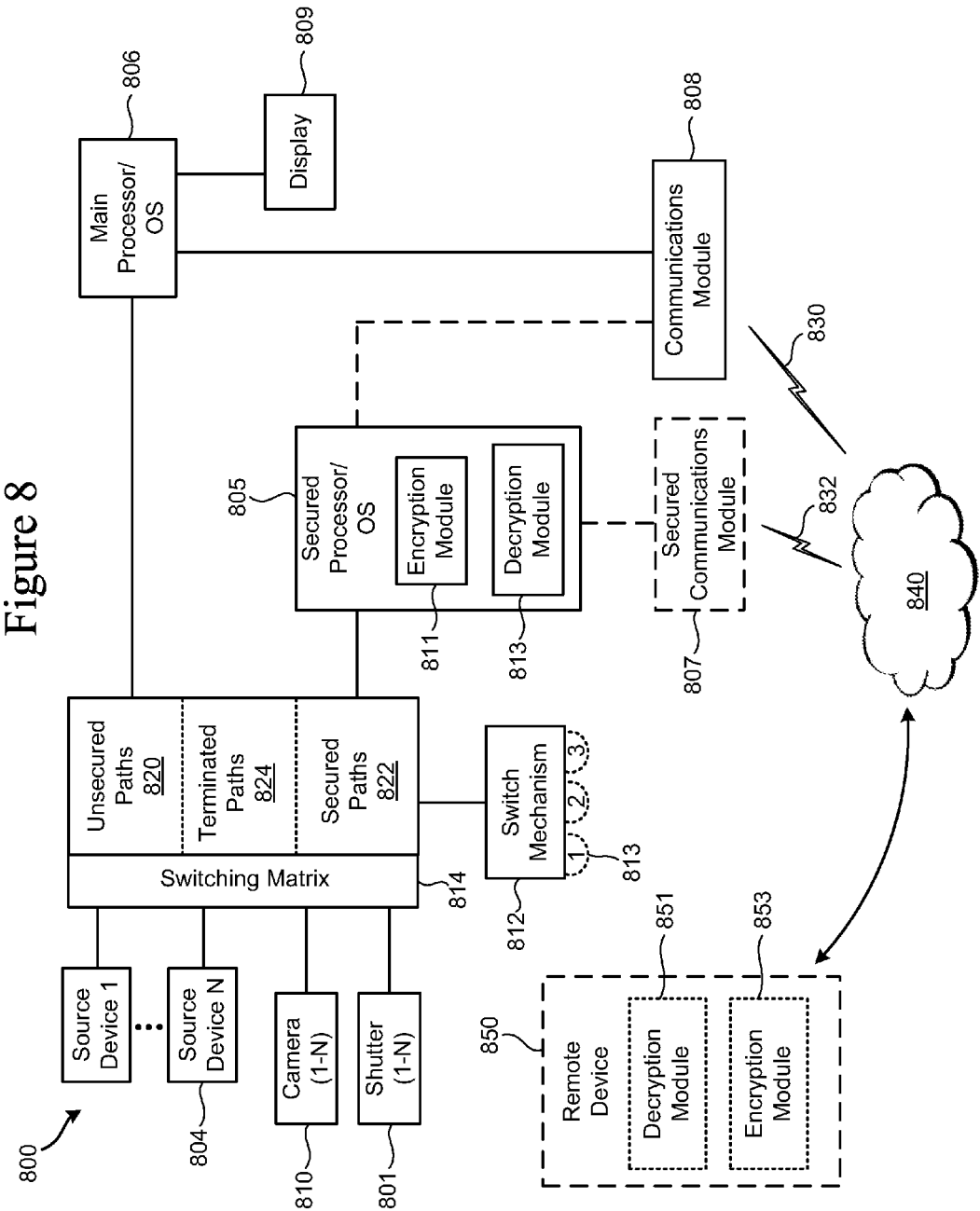
FIG. 8 is a block diagram of a mobile communication device configured to implement a secured communications methodology in accordance with some embodiments.

FIG. 8 is a block diagram of a mobile communication device configured to implement a secured communications methodology in accordance with various embodiments. The mobile communication device 800 illustrated in FIG. 8 includes a number of sources 804 coupled to a switching matrix 814 which is controlled by a switch mechanism 812. The sources 804 shown in FIG. 8 include one or more cameras 810, each of which is equipped with a shuttering arrangement 801. When activated by the switching matrix 814, each of the shutters 801 obscures a lens of its corresponding camera 810. The switch mechanism 812 may include a three-way switch 813, which allows user selection of one of three modes of device operation according to various embodiments. When a first state is selected by the user, indicated by position 1 of switch 813, the device 800 operates in a normal mode. In the normal mode of operation, the shutters 801 remain in their unshuttered state and sources 804 are coupled to the main processor 804 and other components of the device 800 (e.g., display 809) via unsecured transmission paths 820 via the switching matrix 814.

When a second state is selected by the user, indicated by position 2 of switch 813, the device 800 operates in an idle privacy mode, in which the camera shutters 801 are activated (e.g., cover or obscure a camera lens) and output signals from source devices 804 are diverted to termination transmission paths 824 via the switching matrix 814. In the idle privacy mode, an open circuit or other physical barrier can be provided to prevent source device signals from reaching the main processor 806 and/or other components of the device 800. The idle privacy mode can be deactivated by the user selecting position 1 of switch 813. Moving the switch 813 from position 2 to position 1, for example, causes the switching matrix 814 to deactivate the shutters 801, decouple the sources 804 from the termination paths 824, and couple the sources 804 to the unsecured transmission paths 820.

When a third state is selected by the user, indicated by position 3 of switch 813, the device 800 operates in an active privacy mode, in which output signals from source devices 804 are diverted away from the unsecured transmission paths 820 and to the secured transmission paths 822 within the device 800. In the active privacy mode, signals from sources 804 can be communicated to the secured processor 805 and out of the device 800 via a secured communications module 807 according to some embodiments. In a camera-privacy mode, moving of switch 813 to position 3 can cause the camera shutters 801 to activate and the camera signal transmission paths to couple to terminated load paths 824, while other source signals are diverted from unsecured transmission paths 820 to secured transmission paths 822 within the device 800.

In some implementations, the source signals can be encrypted by an encryption module 811 prior to being transmitted to the secured communications module 807. In other embodiments, signals from sources 804 received by the secured processor 805 can be communicated out of the device 800 via the unsecured communications module 808 by way of the encryption module 811 and/or a firewall. Encrypted signals transmitted out of device 800 can be communicated to a remote device 850 via a network 840. It is noted that, in some embodiments, encryption can be performed at the source 804, prior to the switching matrix 814, or prior to the secured processor 805 by a suitable encryption device and/or algorithm, rather than by the secured processor.

In other embodiments, source signals transmitted to and encrypted by the secured processor 805 can be communicated to an external location via the communications module 808 or other unsecured link. This scenario is an example of a secured transmission, because the source signals follow a fully secure path before they are encrypted, and subsequent privacy is afforded by the encryption despite transmission via an unsecure link. In a scenario involving receiving of encrypted signals from an external location via communications module 808 or other component (e.g., an audio, video or data jack of the device), privacy is afforded by the decryption of the received signals within the device (e.g., by the decryption module 813 of the secured processor 805) despite receiving the encrypted signals via an unsecure link. In this scenario, the received and subsequently decrypted signals follow a fully secure path after being decrypted.

The remote device 850 includes a decryption module 851 that operates on the encrypted signals received from the device 800 to recover the original source device information. Signals originating at the remote device 850 can be encrypted via an encryption module 853 and transmitted to the device 800 via the network 840. Encrypted signals transmitted by the remote device 850 can be received by the device 800 via the unsecured communications module 808, in some embodiments, or the secured communications module 807, in other embodiments. The encrypted signals received by the device 800 can be decrypted by the decryption module 811 of the secured processor 805. The active privacy mode can be deactivated by the user selecting position 1 of switch 813. Moving the switch 813 from position 3 to position 1 causes the switching matrix 814 to decouple the sources 804 from the secured transmission paths 822 and couple the sources 804 to the unsecured transmission paths 820. If presently operating in a camera-privacy mode, moving the switch 813 from position 3 to position 1 deactivates the shutters 801 and causes the switching matrix 814 to decouple the cameras 810 from the terminated load paths 824 and couple the cameras 810 to the unsecured transmission paths 820.

FIGS. 9-13 are diagrams illustrating various configurations of a mobile communications device adapted to implement secured communication methodologies in accordance with various embodiments of the present disclosure. The embodiments of FIGS. 9-13 are intended to show a variety of representative device configurations for illustrative purposes, it being understood that other configurations are contemplated. It is noted that the embodiments shown in FIGS. 9-13 are described in the context of a mobile communication device (e.g., a mobile phone, smartphone, tablet, personal digital assistant, laptop), but that the secured communication methodologies disclosed herein may be implemented in stationary communication devices, such as desktops, security cameras, desktop telephones, television sets, set-top boxes, and webcams, among others. Embodiments of the disclosure can be implemented as part of telecommunications equipment of a vehicle, such as an automobile. The user actuatable switch may be located on a control panel or console of the vehicle, and may be actuated manually or via voice command (e.g., a hands-free implementation) by the user.

Figure 9:
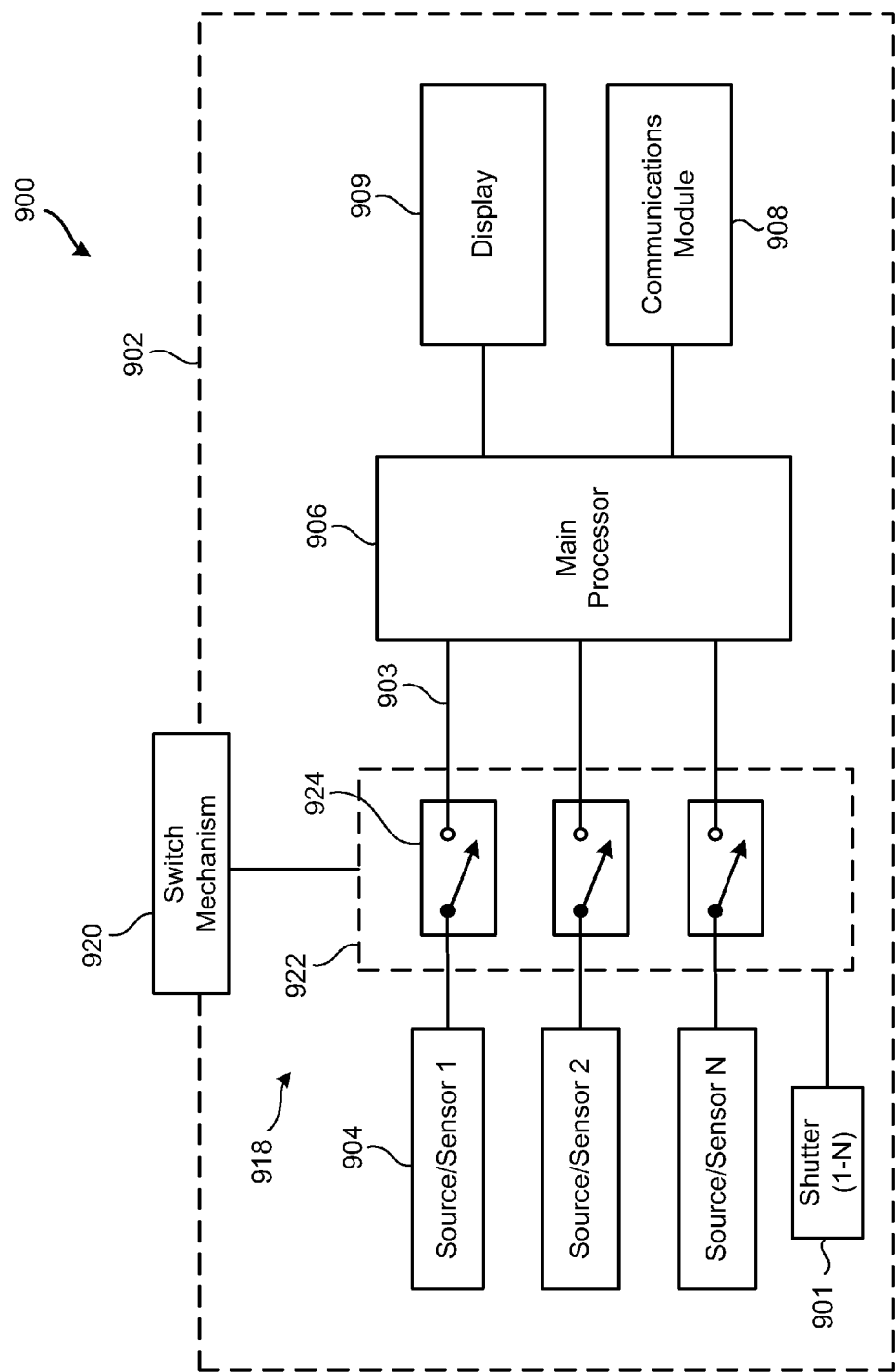
FIG. 9 is a block diagram of a mobile communication device configured to implement a secured communications methodology in accordance with other embodiments.

FIG. 9 shows a mobile communication device configured to implement a secured communications methodology in accordance with various embodiments. The device 900 shown in FIG. 9 includes a housing 902 configured for hand-held manipulation by a user. Supported within the housing 902 are a main processor 906, a display 909, and a communications module 908. Also included within the housing 902 is a switch 918 comprising a switch matrix 922 and a number of switches 924. The device 900 includes a number of components 904 each coupled to a respective switch 924 of the switch matrix 922. In some embodiments, the components 904 include one or more sources, one or more sensors, or a combination of sources and sensors. The sources and sensors may be of a type previously described herein. At least one of the sources 904 can be a camera, and at least one shutter 901 is coupled to the switch matrix 922 and optically coupled to the camera. A switch mechanism 920 is coupled to the switch matrix 922 and mounted on the device 900 such that at least a portion of the switch mechanism 920 is accessible on an outer surface of the housing 902 by the user. The switch mechanism 920 can be actuated by a user to selectively activate and deactivate the switches 924 of the switch matrix 922 and the shutter 901.

During normal device operation, each of the components 904 is communicatively coupled to the main processor 906 via the switches 924 and transmission paths 903, respectively. In response to user actuation of the switch mechanism 920, the components 904 coupled to the switch matrix 922 are respectively decoupled from a transmission path 903 (e.g., unsecured transmission path) that includes the main processor 906 and other components (if applicable) susceptible to surreptitious access by an external entity. The shutter 901 can be selectively activated and deactivated in accordance with one or more privacy mode as selected by the switch 918. In the simplified illustration of switch matrix 922 shown in FIG. 9, activating the switch mechanism 920 by the user causes each of the switches 924 to create an open circuit, thereby preventing signal transmission between the components 904 and the main processor 906. Deactivating the switch mechanism 920 by the user causes re-coupling of signal transmission between each of the components 904 and the main processor 906 via the switches 924.

Figure 10:
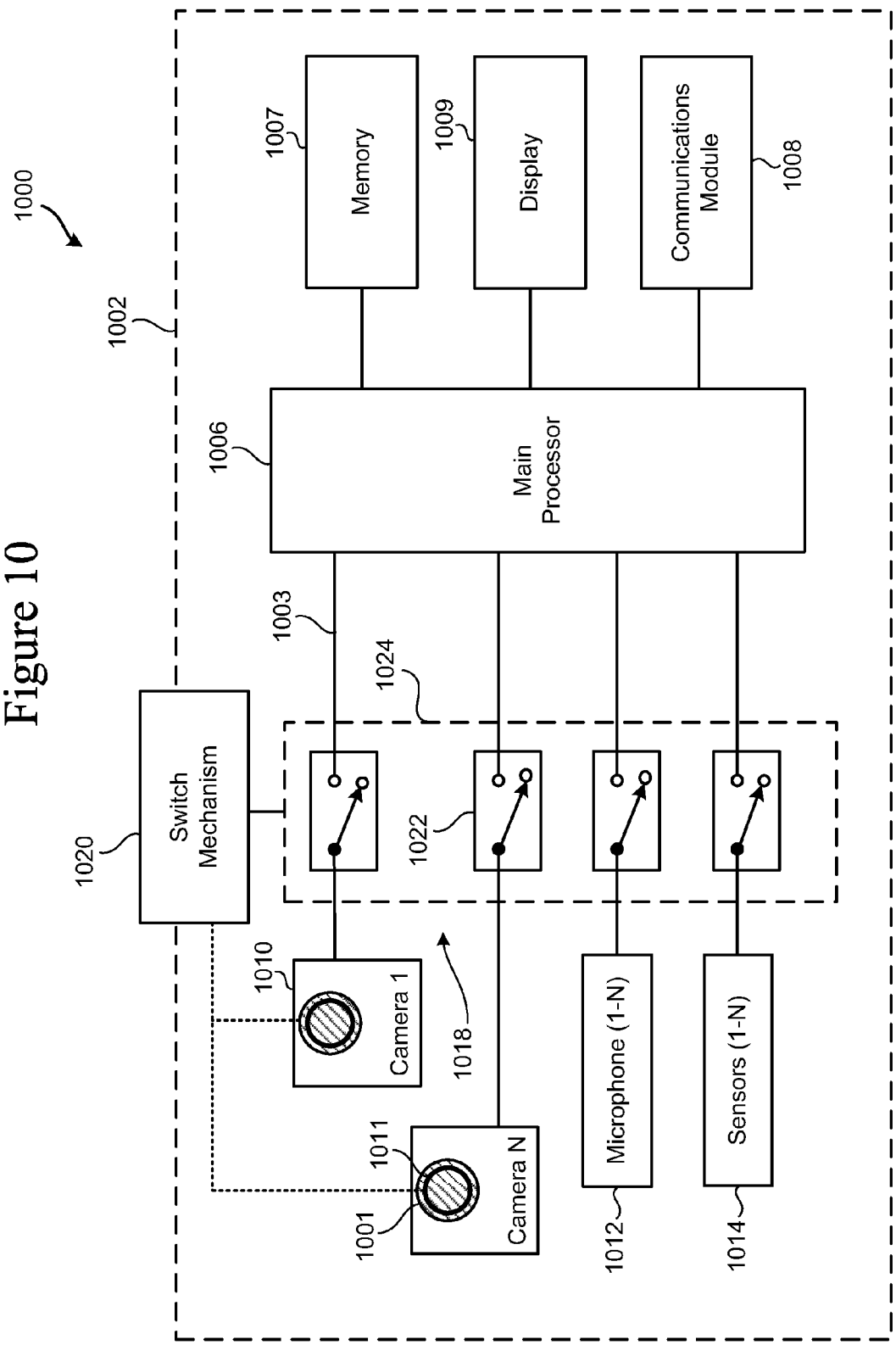
FIG. 10 is a block diagram of a mobile communication device configured to implement a secured communications methodology in accordance with further embodiments.

According to some embodiments, the mobile communication device 900 may be equipped with a tamper-proof switch 918 that, when activated intentionally or unintentionally, causes irreversible decoupling of the components 904 and shuttering of the camera(s) via a shutter 901. In some embodiments, the switch 918, alone or in combination with a "confirmation" switch (not shown), may be configured to irreversibly decouple the components 904 (all or selected components 904) from their respective transmission paths 903 and initiate camera shuttering when activated by the user. In other embodiments, the switch decoupling and camera shuttering may be permanent, such as by activation of a fused connection and creation of a permanent open circuit. In further embodiments, irreversible decoupling of the components 904 from their respective transmission paths 903 and camera shuttering can be considered irreversible by the user of the device 900, but reversible by a technician, such as by physically accessing a hardware reset mechanism (e.g., replacement of a fuse-like component) within the housing 902 of the device 900. In some embodiments, irreversible decoupling of the components 904 from their respective transmission paths 903 and camera shuttering can be considered irreversible by the user of the device 900, but reversible by a technician, such as by connecting with the device 900 and resetting the switch 918 using a special software routine or code known only to the technician. Such embodiments provide for tamper-proofing of the mobile communication device 900 by the user, who may or may not be the owner of the device 900. For example, repeated attempts to gain access to the device 900 by a party FIG. 10 shows a mobile communication device configured to implement a secured communications methodology in accordance with other embodiments. The device 1000 shown in FIG. 10 includes a number of sources and one or more sensors, each of which can be selectively coupled and decoupled to/from a main processor 1006 by selective actuation of a switch 1018 by a user. FIG. 10 also shows a number of cameras 1010 equipped with respective shuttering mechanisms 1001. The main processor 1006 is shown coupled to a display 1009, a communications module 1008, and a memory 1007. In the embodiment of FIG. 10, one or more cameras 1010, one or more microphones 1012, and one or more sensors 1014 are coupled to inputs of a switch matrix 1022 of the switch 1018, respectively. A switch mechanism 1020 is coupled to the switch matrix 1022 and mounted on the device 1000 such that at least a portion of the switch mechanism 1020 is accessible on an outer surface of the housing 1002 by the user. The switch mechanism 1020 can be actuated by a user to selectively activate and deactivate the switches 1024 of the switch matrix 1022.

As illustrated, each camera 1010 has an associated shutter mechanism 1001 having a lens shutter configured to cover or obscure a lens 1011 of the camera 1010 when activated. The shutters 1001 are shown coupled to and controlled by the switch 1020 in the embodiment illustrated in FIG. 10. In other embodiments, such as those discussed previously, the shutters 1001 can be coupled to and controlled by the switch matrix 1024.

During normal device operation, each of the cameras 1010, microphones 1012, and sensors 1014 is communicatively coupled to the main processor 1006 via the switches 1024 and transmission paths 1003, respectively. In a normal operating mode, the camera shutters 1001 are in a deactivated state. In response to user activation of the switch mechanism 1020, the cameras 1010, microphones 1012, and sensors 1014 coupled to the switch matrix 1022 are respectively decoupled from a transmission path 1003 (e.g., unsecured transmission path) that includes the main processor 1006 and other components (if applicable) susceptible to surreptitious access by an external entity. In the simplified illustration of switch matrix 1022 shown in FIG. 10, activating the switch mechanism 1020 by the user causes each of the switches 1024 to create an open circuit, thereby preventing signal transmission between the cameras 1010, microphones 1012, and sensors 1014 and the main processor 1006. Additionally, activation of the switch mechanism 1020 causes each of the shutters 1001 to activate, such that the lens of each camera 1010 is covered or obscured by a shutter 1001. Deactivating the switch mechanism 1020 by the user causes deactivation of the shutters 1001 and re-coupling of signal transmission between each of the cameras 1010, microphones 1012, and sensors 1014 and the main processor 1006 via the switches 1024.

Figure 11:
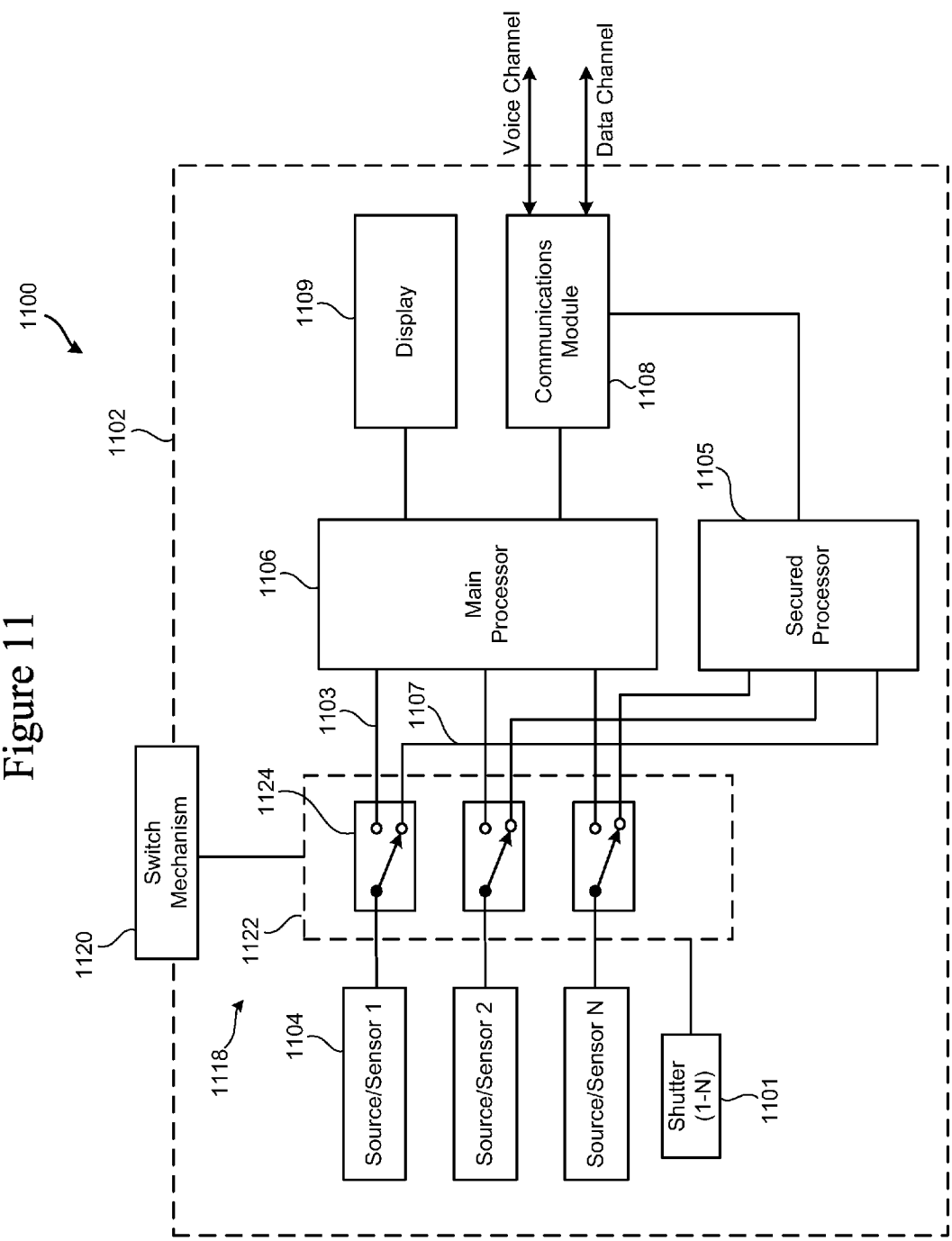
FIG. 11 is a block diagram of a mobile communication device configured to implement a secured communications methodology in accordance with some embodiments.

FIG. 11 shows a mobile communication device configured to implement a secured communications methodology in accordance with further embodiments. The device 1100 shown in FIG. 11 includes a number of components 1104, each of which can be selectively coupled and decoupled to/from a main processor 1106 and to/from a secured processor 1105 by selective actuation of a switch 1118 by a user. In some embodiments, the components 1104 include one or more sources, one or more sensors, or a combination of sources and sensors. The sources and sensors may be of a type previously described herein. One or more of the sources 1104 may be a camera, in which case a shutter 1101 is positioned relative to a lens of the camera. The main processor 1106 is shown coupled to a display 1109 and a communications module 1108. In the embodiment of FIG. 11, the components 1104 are respectively coupled to inputs of a switch matrix 1122 of the switch 1118. A switch mechanism 1120 is coupled to the switch matrix 1122 and mounted on the device 1100 such that at least a portion of the switch mechanism 1120 is accessible on an outer surface of the housing 1102 by the user. The switch mechanism 1120 can be actuated by a user to selectively activate and deactivate the switches 1124 of the switch matrix 1122. The shutter(s) 1101 are shown coupled to and controlled by the switching matrix 1122, but may alternatively be coupled to and controlled by the switch mechanism 1120 or a controller of the camera.

During normal device operation, each of the components 1104 is communicatively coupled to the main processor 1106 via the switches 1124 and transmission paths 1103, respectively. In response to user activation of the switch mechanism 1120, the components 1104 coupled to the switch matrix 1122 are respectively decoupled from a transmission path 1103 (e.g., unsecured transmission path) that includes the main processor 1106 (and other components susceptible to surreptitious access by an external entity) and coupled to the secured processor 1105. If a camera-privacy mode is selected, the shutter 1101 of each camera is activated, and the camera signals can be diverted to termination loads or to the secured processor 1105 as unusable signals. Deactivating the switch mechanism 1120 by the user causes deactivation of the shutters 1101 if applicable, re-coupling of signal transmission between each of the components 1104 and the main processor 1106, and decoupling of the components 1104 and the secured processor 1105 via the switches 1124.

In the embodiment shown in FIG. 11, the secured processor 1105 is coupled to the communications module 1108, to which the main processor 1106 is also coupled. The secured processor 1105 is preferably configured to encrypt and decrypt information transmitted between the secured processor 1105 and the communications module 1108. A firewall may also be provided between the secured processor 1105 and the communications module 1108. According to some embodiments, encrypted information (e.g., voice, text, data, video) is communicated between the secured processor 1105 and a remote device via a data channel when operating in a privacy mode in response to activation of the switch mechanism 1120. During a normal mode of operation in response to non-activation or deactivation of the switch mechanism 1120, voice data is typically communicated between the device 1100 and a remote device via a voice channel, while text and data is communicated via a data channel.

Figure 12:
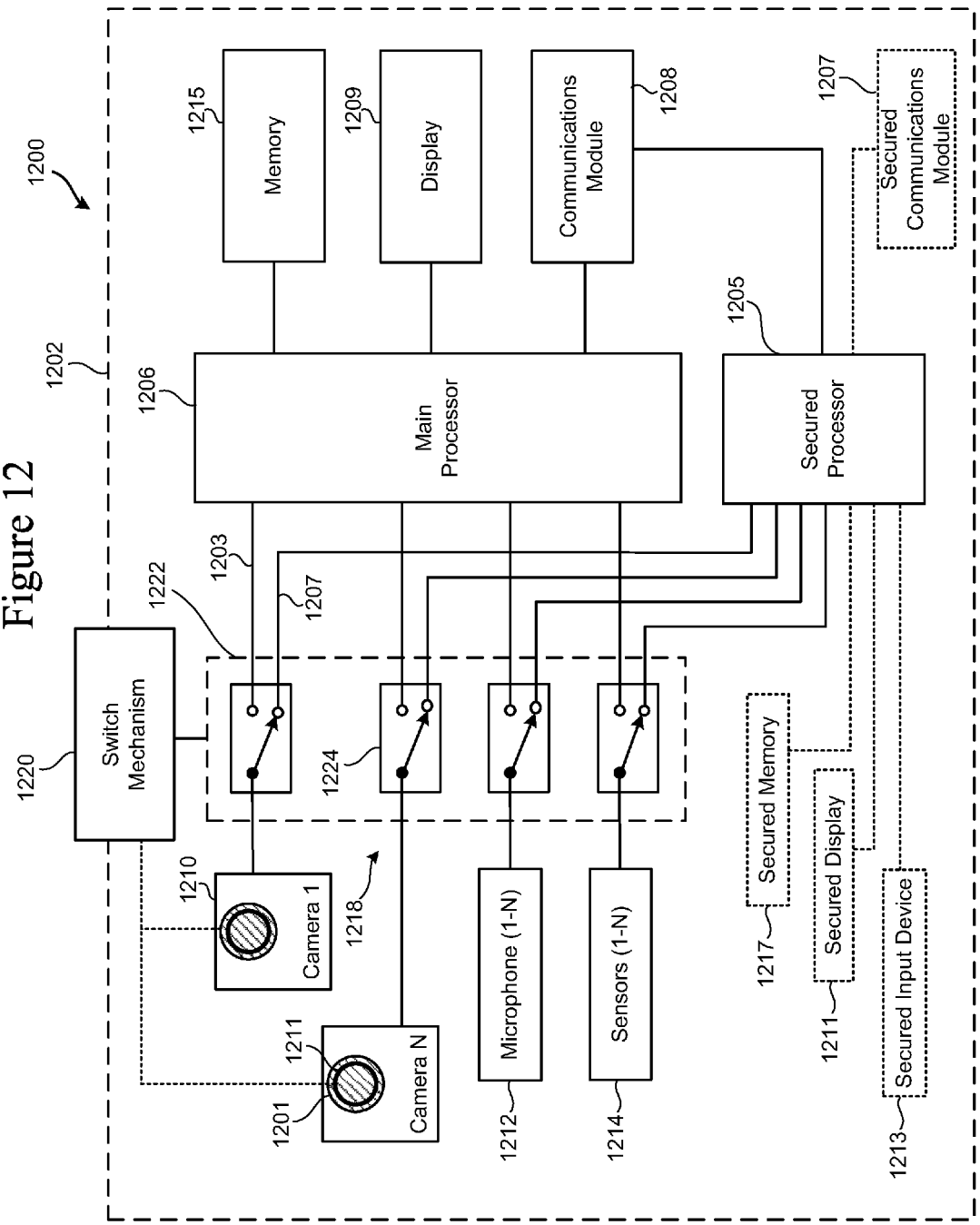
FIG. 12 is a block diagram of a mobile communication device configured to implement a secured communications methodology in accordance with other embodiments.

FIG. 12 shows a mobile communication device configured to implement a secured communications methodology in accordance with other embodiments. The device 1200 shown in FIG. 12 includes one or more cameras 1210 each equipped with a shutter mechanism 1201, one or more microphones 1212, and one or more sensors 1214, each of which can be selectively coupled and decoupled to/from a main processor 1206 and to/from a secured processor 1205 by selective actuation of a switch 1218 by a user. The sensors 1214 can include one or more of a GPS sensor, accelerometer(s), gyroscope(s), magnetometer(s), barometer, thermometer, proximity sensor, ambient light sensor, compass, heart rate sensor, and a pedometer, among others. The main processor 1206 is shown coupled to a memory 1215, a display 1209, and a communications module 1208.

In some embodiments, the secured processor 1205 is coupled to the communications module 1208 (and protected via an encryption/decryption module and/or a firewall), while in other embodiments the secured processor 1205 is coupled to a secured communications module 1207. In the embodiment shown in FIG. 12, the secured processor 1205 can be coupled to a secured memory 1217, a secured display 1211, and a secured input device 1213 such as a keypad. The secured display 1211 may be a dedicated display (e.g., a small display compared to the main display 1209) or a separately driven portion of the main display 1209. The secured input device 1213 may be embodied as a physical keypad or a virtual keypad presented within the secured display 1211. The secured input device 1213 and display 1211 can facilitate implementation of various security features of the device 1200, such as secured input of PIN numbers and passwords and creation of secured texts and emails. The secured memory 1217, secured communications module 1215, secured display 1211, and secured input device 1213 are inaccessible to the main processor 1206, the communications module 1208, and all other components that may be susceptible to surreptitious access by an external entity.

In the embodiment of FIG. 12, the cameras 1210, microphones 1212, and sensors 1214 are coupled to inputs of a switch matrix 1222 of the switch 1218, respectively. A switch mechanism 1220 is coupled to the switch matrix 1222 and mounted on the device 1200 such that at least a portion of the switch mechanism 1220 is accessible on an outer surface of the housing 1202 by the user. A shutter 1201 is optically coupled to a lens 1211 of each camera 1210 and controlled by the switch mechanism 1220 or, if desired, the switch matrix 1222 or a controller of the camera 1210. The switch mechanism 1220 can be actuated by a user to selectively activate and deactivate the shutters 1201 and the switches 1224 of the switch matrix 1222. During normal device operation, each of the cameras 1210, microphones 1212, and sensors 1214 is communicatively coupled to the main processor 1206 via the switches 1224 and transmission paths 1203, respectively. The shutters 1201 are in a deactivated state during normal device operation. In response to user activation of the switch mechanism 1220, the cameras 1210, microphones 1212, and sensors 1214 are respectively decoupled from transmission paths 1203 (e.g., unsecured transmission paths) that includes the main processor 1206 (and other components susceptible to surreptitious access by an external entity) and coupled to the secured processor 1205 via the switches 1224 and secured transmission paths 1207. If a camera-privacy mode has been selected, the shutters 1201 are activated, and the camera signals may be diverted to terminating load paths or passed onto the secured processor 1205 as unusable signals. Deactivating the switch mechanism 1220 by the user causes re-coupling of signal transmission between each of the cameras 1210 (and deactivation of any previously activated shutters 1201), microphones 1212, and sensors 1214 and the main processor 1206, and decoupling of the cameras 1210, microphones 1212, and sensors 1214 from the secured processor 1205 via the switches 1224.

Figure 13:
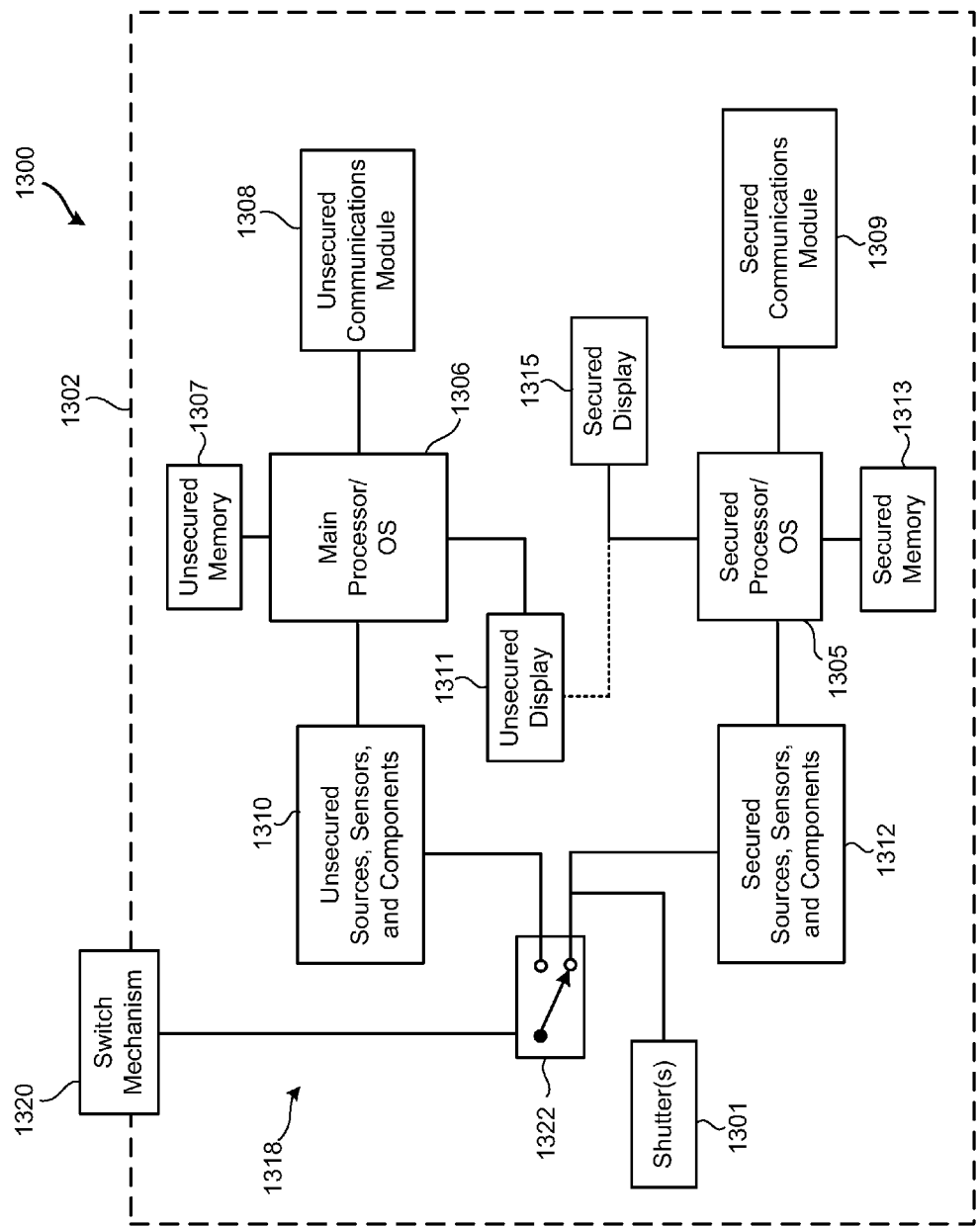
FIG. 13 is a block diagram of a mobile communication device configured to implement a secured communications methodology in accordance with various embodiments.

FIG. 13 illustrates an embodiment of a mobile communication device configured to implement a secured communications methodology in accordance with various embodiments. The mobile communication device 1300 shown in FIG. 13 provides a relatively high degree of security and privacy by virtue of a mirrored architecture. The device 1300 effectively incorporates a dual-device architecture, one unsecured and one secured, each of which can be operated substantially independently of the other. The unsecured architecture of the device 1300 includes various unsecured sources, sensors and components (e.g., data interfaces, audio jacks, video jacks) 1310 which are communicatively coupled to a main processor 1306. An unsecured memory 1307, an unsecured communications module 1308, and an unsecured display 1311 are coupled to the main processor 1306. The main processor 1306 is configured to implement a primary operating system of the device 1300. The unsecured components allow the mobile communication device to be operated as if it were a typical commercial device.

The secured architecture of the device 1300 includes various secured sources, sensors, and components (e.g., data interfaces, audio jacks, video jacks) 1312 which are communicatively coupled to a secured processor 1305 via secured transmission paths 1207. The secured processor 1305, which is configured to implement a secured operating system, is coupled to a secured memory 1313, a secured communications module 1309, and a secured display 1315. The secured memory 1313 may be accessed by secured components other than or in addition to the secured processor 1305. The secured processor 1305 may also be coupled to an optional secured keypad or other user input device (see, e.g., FIG. 12). One or more shutters 1301 can be optically coupled to one or more camera lenses and controlled by a switch 1318, the secured processor 1305 or a controller of the camera to which the shutter 1301 is associated. The security components of the device 1300 are inaccessible to unsecured components of the device 1300 that may provide surreptitious access to the secured components.

The secured display 1315 may be a display or device separate from the unsecured display 1311 and located elsewhere on the housing 1302, such as on the rear surface of the housing 1302. The secured display 1315 may be relatively small in size in relation to the main (unsecured) display 1311, and may be a simple and/or technology-inferior device (e.g., monochromatic, inexpensive, non-touch screen). In some embodiments, the secured display 1315 is intended to be used for sending specific private communications, such as sensitive text messages, credit card or bank account information, or other private or sensitive information. The secured display 1315 is likely to be used very briefly, and can be connected via a switching arrangement to provide for switching between secured and unsecured components of the device 1300. For example, the secured display 1315 can be coupled to a switching arrangement that allows a user to use the main display 1311 for the bulk of a given interaction, then quickly switch to the secured processor and operating system 1305 for entering his/her bank account, or for sending a sensitive text message, and then switch back again to the unsecured processor 1306. The secured display 1315 may also be a physically separate device that is connected to the device 1300 via a special cable, such as one that uses a special secured communications protocol, or possibly via a secured wireless connection (e.g., by means of a proprietary encrypted wireless protocol).

The secured components, under the control of the secured processor and operating system 1305, allow the mobile communication device 1300 to be operated in one or more privacy modes. In some privacy modes, one or more unsecured components, transmission paths or resources may be utilized (e.g., wired or wireless headset or earpiece, external microphone, external speaker such as a Bluetooth® speaker), with proper security safeguards in place to provide an acceptable level of security (e.g., via encryption/decryption, firewalls, etc.). In other privacy modes, no unsecured component, transmission path or resource can access or provide a means to access to the security components of the device 1300, thereby precluding surreptitious access to the mobile communication device by a remote device or user. According to some embodiments, a common (unsecured) display 1311 is coupled to the main processor 1306, and also to the secured processor 1305 via an encryption/decryption module or firewall. In some privacy modes, the shutters 1301 of the device cameras can be selectively activated, thereby assuring the user that no image information can be acquired by the device and, therefore, surreptitiously accessed by a remote entity.

The switch 1318 is coupled to the unsecured device architecture and the secured device architecture of the device 1300. The switch 1318 includes a switch mechanism 1320 coupled to a switch 1322. The switch mechanism 1320 is mounted on the device 1300 such that at least a portion of the switch mechanism 1320 is accessible on an outer surface of the housing 1302 by the user. The switch mechanism 1320 can be actuated by a user to selectively activate and deactivate the switch 1322. During normal device operation, elements of the unsecured architecture (1310, 1306, 1308) are operative, and elements of the secured architecture (1312, 1305, 1309) are inoperative with respect to interactions between the device 1300 and the user and/or external entities. In response to user actuation of the switch mechanism 1320, a privacy mode of device operation is initiated. During the privacy mode of device operation, elements of the secured architecture (1312, 1305, 1309, selectively 1301) are operative, and elements of the unsecured architecture (1310, 1306, 1308) are inoperative with respect to interactions between the device 1300 and the user and/or external entities. As in the case of other embodiments, information exchanged between the secured processor 1305 and external devices is preferably effected via a data channel, rather than a voice channel.

Figure 14:
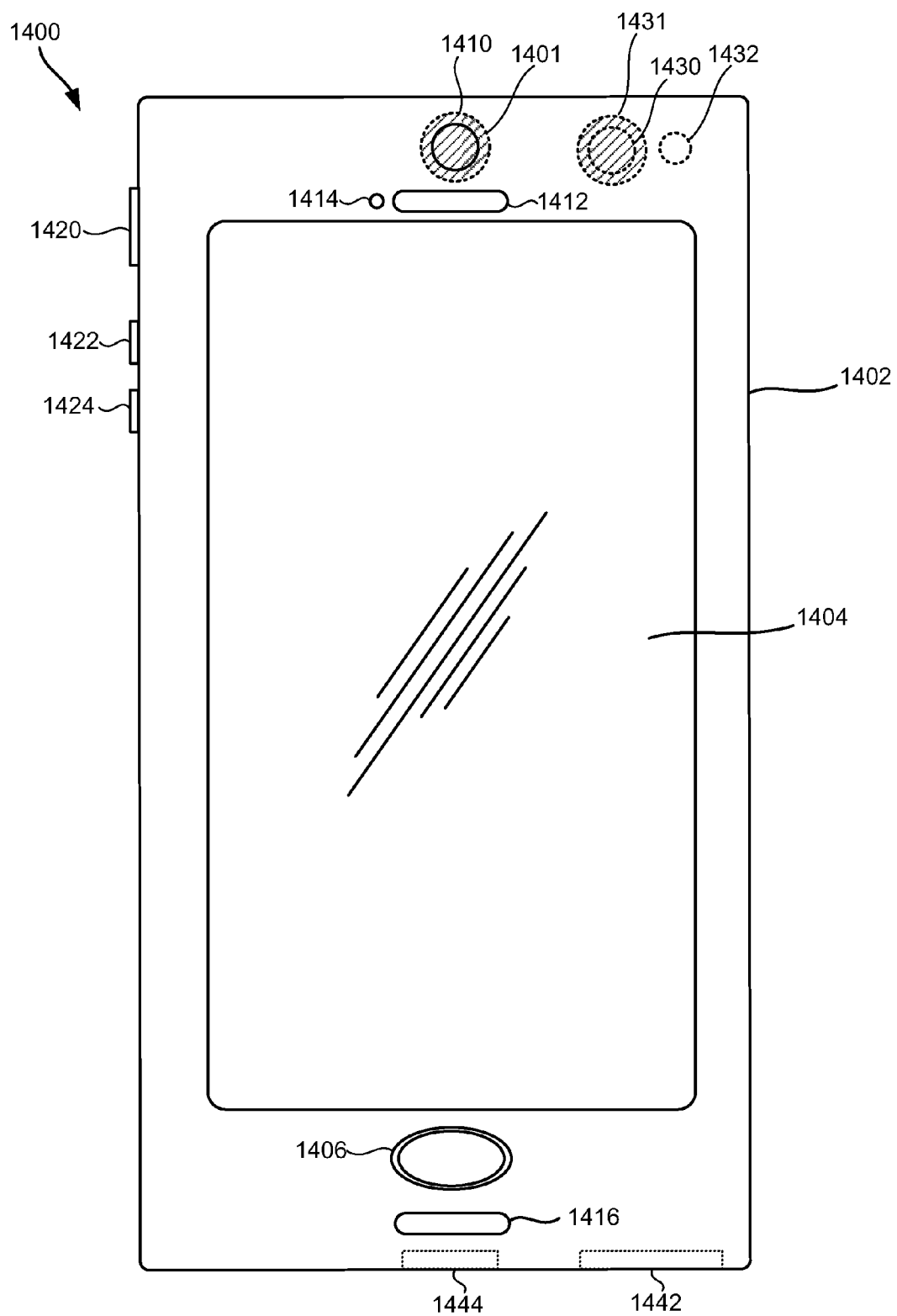
FIG. 14 is a representative mobile communication device configured to implement a secured communications methodology in accordance with various embodiments.

FIG. 14 is a representative mobile communication device configured to implement a secured communications methodology in accordance with various embodiments. The device 1400 shown in FIG. 14 includes a housing 1402 configured for hand-held manipulation by a user. The housing 1402 supports a display 1404, a front camera 1410, an ambient light sensor 1414, a first microphone 1416, an optional second microphone 1412, and a control button 1406, each accessible at a front surface of the housing 1402. A rear camera 1430 and flash unit 1432 are provided at a rear surface of the housing 1402. A speaker 1442 and a data/power interface 1444 are provided along a lower side surface of the housing 1402. An upper side surface of the housing 1402 supports a number of switches, including volume increase and decrease buttons 1422, 1424 and a privacy mode switch 1420. The privacy mode switch 1420 is actuatable by the user to cause the device 1400 to switch device operation between a normal mode of operation and one or more privacy modes of operation (e.g., idle privacy mode, active privacy mode, camera-privacy mode), in accordance with embodiments disclosed herein. The device 1400 may be representative of a smartphone, a PDA, a tablet or other hand-held mobile communication device.

A first lens shutter 1401 is shown superimposed over a lens of the front camera 1410. The first lens shutter 1401 is situated within the housing 1402 and in front of the camera lens. When activated, the first lens shutter 1401 covers or obscures the lens of the front camera 1410, thereby preventing acquisition of images by the front camera 1410. In various embodiments, the first lens shutter 1401 can be of a type that provides a visual verification of its shuttered status when activated. For example, the first lens shutter 1401 may be of a color (e.g., bright or vibrant orange, yellow or green) or reflectivity (or other optical property) that can be readily perceived by the user when activated. In some embodiments, activation of the first lens shutter 1401 can involve actuation of an indicator coupled to or separate from the lens shutter structure, that captures the user's attention.

For example, activating the switch 1420 can result in physically attaching or coupling to an indicator that moves into place when the lens shutter structure is actuated (e.g., a colored disc that shows through an opening in the housing 1402). In another example, activating the switch 1420 can result in turning on an LED that is coupled either directly or indirectly to the lens shutter structure. An example of direct coupling would be to provide a mechanical switch to turn on the LED that is actuated by the lens shutter itself moving into place. An example of indirect coupling to the LED would be to have the LED wired to the overall switching system that actuates all the privacy features. An LED or other illumination device can be situated at a conspicuous location of the housing 1402 (e.g., near a camera or the display), and illuminated (e.g., continuously ON or pulsed ON/OFF) in response to activation of the switch 1420.

The device 1400 shown in FIG. 14 includes a rear camera 1430 over which a second lens shutter 1431 is positioned. The second lens shutter 1431 is situated within the housing 1402 and in front of lens of the rear camera 1430. When activated, the second lens shutter 1431 covers or obscures the lens of the rear camera 1430, thereby preventing acquisition of images by the rear camera 1430. Typically, the first and second lens shutters 1401, 1431 are activated concurrently in response to activation of the privacy switch 1420. The first and second lens shutters 1401, 1431 are typically deactivated concurrently in response to deactivation of the privacy switch 1420.

According to some embodiments, the first and second lens shutters 1401, 1431 comprise an electro-optical element, such as a liquid crystal element, that shutters the lenses of the front and rear cameras 1410, 1430 by changing from clear to opaque, or becomes diffusive, upon receiving an electrical stimulus. Use of an electro-optical element as a lens shutter 1401, 1431 is particularly useful in embodiments where the shutter mechanism is fixed. In other embodiments, as will be described hereinbelow, at least a portion of the shutter mechanism is movable. In such movable embodiments, the lens shutters 1401, 1431 may comprise an electro-optical element or may comprise a coating or insert of opaque or diffuse material.

Figure 15A:
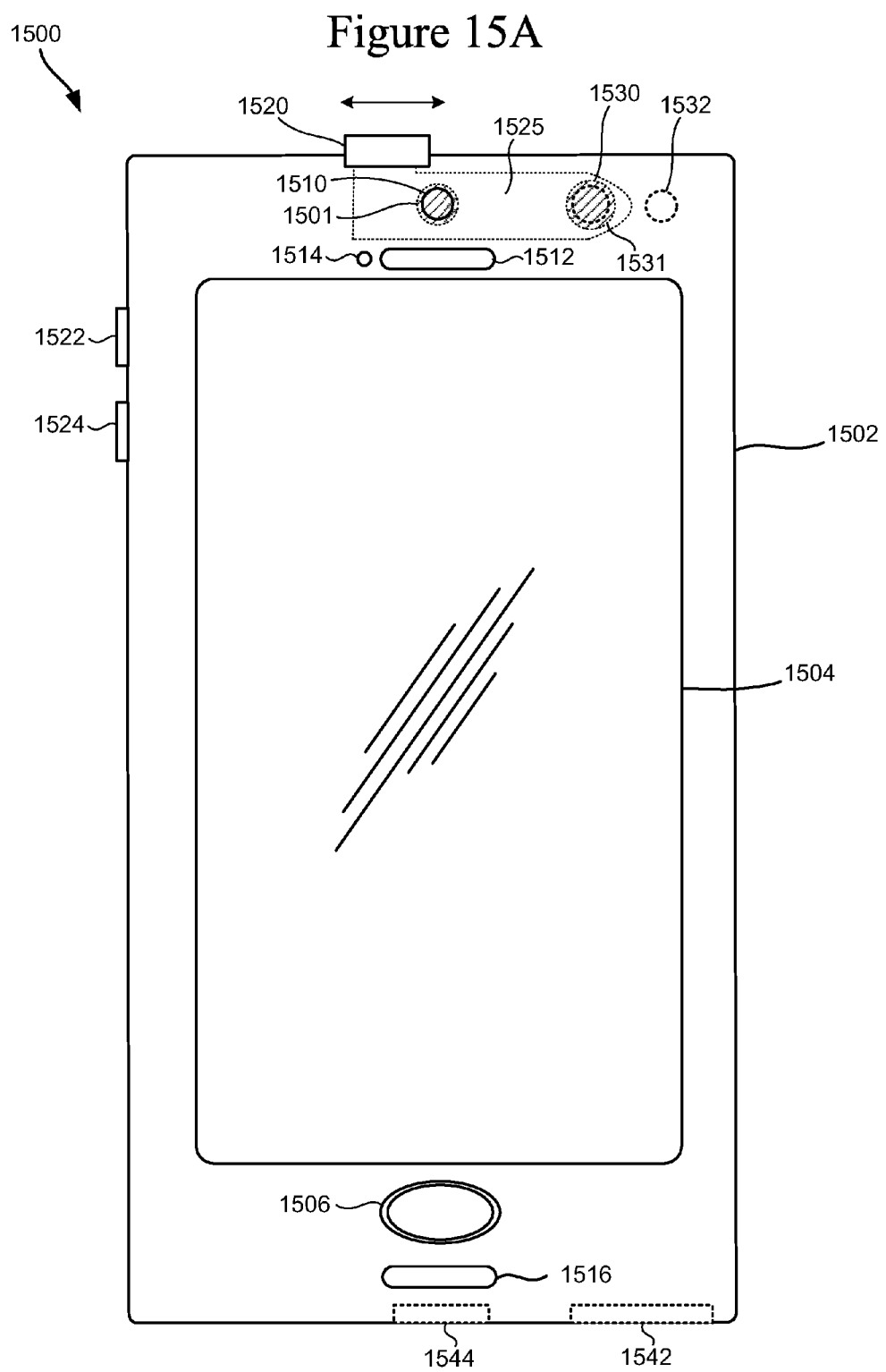
FIGS. 15A-15C show a representative mobile communication device configured to implement a secured communications methodology in accordance with various embodiments.
Figure 15B:
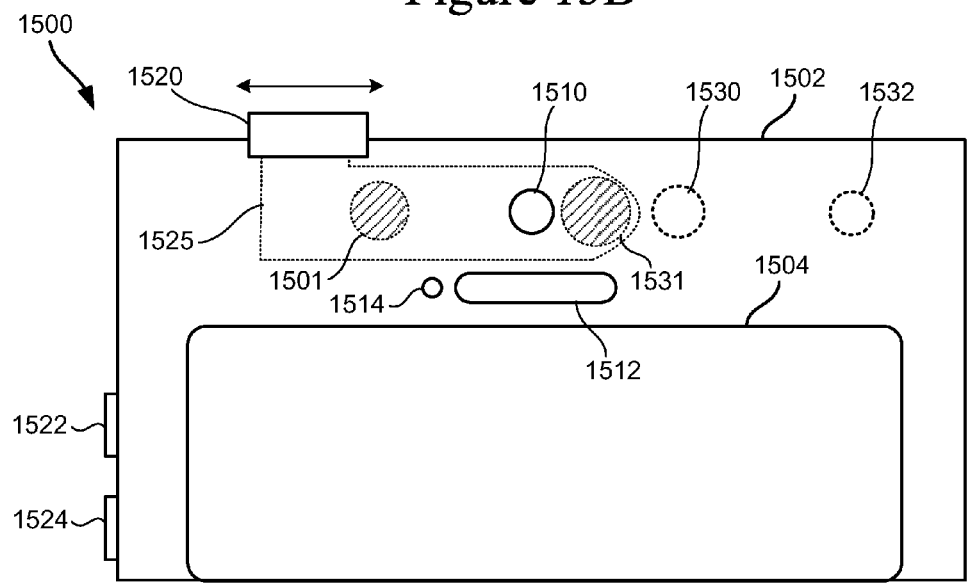
Figure 15C:
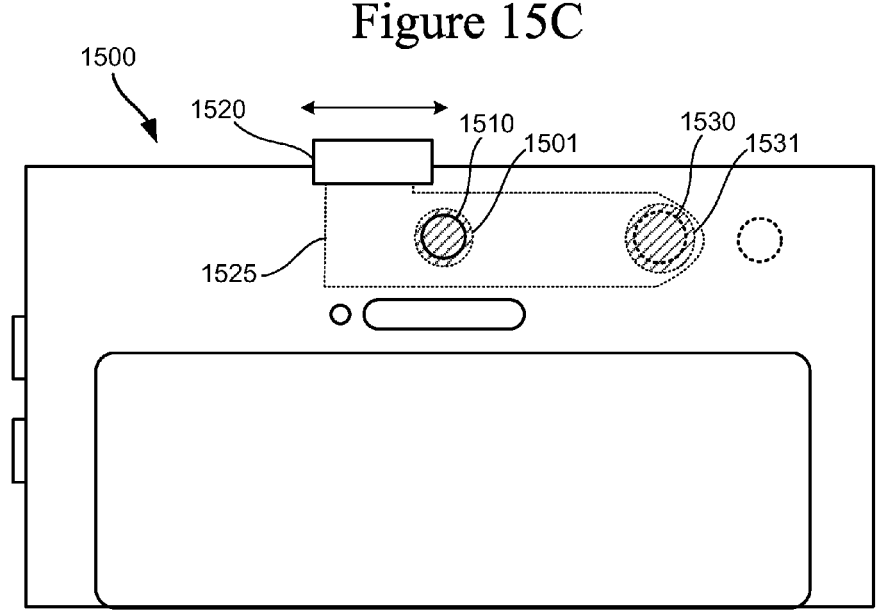

FIGS. 15A-15C show a representative mobile communication device configured to implement a secured communications methodology in accordance with various embodiments. The device 1500 shown in FIGS. 15A-15C includes a housing 1502 configured for hand-held manipulation by a user. The housing 1502 supports a display 1504, a front camera 1510, an ambient light sensor 1514, a first microphone 1516, an optional second microphone 1512, and a control button 1506, each accessible at a front surface of the housing 1502. A rear camera 1530 and flash unit 1532 are provided at a rear surface of the housing 1502. A speaker 1542 and a data/power interface 1544 are provided along a lower side surface of the housing 1502. An upper side surface of the housing 1502 supports a number of switches, including volume increase and decrease buttons 1522 and 1524. A privacy mode switch 1520 is situated at an upper side edge of the housing 1502 and is configured to translate (e.g., move left and right along the upper side edge of the housing 1502) in response to a manual force applied by the user (e.g., via a finder or thumb). The privacy mode switch 1520 is actuatable by the user to cause the device 1500 to switch device operation between a normal mode of operation and one or more privacy modes of operation (e.g., idle privacy mode, active privacy mode, camera-privacy mode), in accordance with embodiments disclosed herein. The device 1500 may be representative of a smartphone, a PDA, a tablet or other hand-held mobile communication device.

In some embodiments, the switch 1520 is mechanically coupled to a shutter mechanism 1525 which is configured to translate within the housing 1502 in concert with translation of the switch 1520. The shutter mechanism 1525 can be formed from optically transparent plastic, with opaque paint or other coating defining the lens shutters 1501 and 1531. The switch 1520 and the shutter mechanism 1525 may define a unitary structure or, in other implementations, can be mechanically connected or coupled disparate structures. It is understood that, in some embodiments, the device 1500 may incorporated a single camera, and that the shutter mechanism 1525 would be configured for use with the single camera, rather than multiple cameras. It is further understood that a device may include a multiplicity of spatially separated cameras, and that more than one switch 1520 and/or shutter mechanism 1525 may be needed to provide image privacy for the disparately situated cameras.

Activation and deactivation of the switch 1520 by the user causes translation of the shutter mechanism 1525 into and out of engagement with the lens of the cameras 1510, 1530 of the device 1520. In some embodiments, the switch 1520 is fixed (i.e., does not translate), and a motor is coupled to the shutter mechanism 1525. Activation and deactivation of the switch 1520 causes the motor to move the shutter mechanism 1525 into and out of engagement with the lens of the cameras 1510, 1530 of the device 1520. When the shutter mechanism 1525 is activated, the lens shutters 1501 and 1531 cover respective lenses of the front and rear cameras 1510 and 1530 (see FIG. 15C). When the shutter mechanism 1525 is deactivated, the lens shutters 1501 and 1531 move out of covered alignment with the respective lenses of the front and rear cameras 1510 and 1530 (see FIG. 15B). In some embodiments, cutouts or voids within the shutter mechanism 1525 can be provided so as to align with the lens of one or both of the cameras 1510 and 1530 when the shutter mechanism 1525 is in a deactivated position. In such embodiments, the lens of one or both of the cameras 1510 and 1530 is not optically obscured by transparent plastic portions of the shutter mechanism 1525.

Figure 16A:
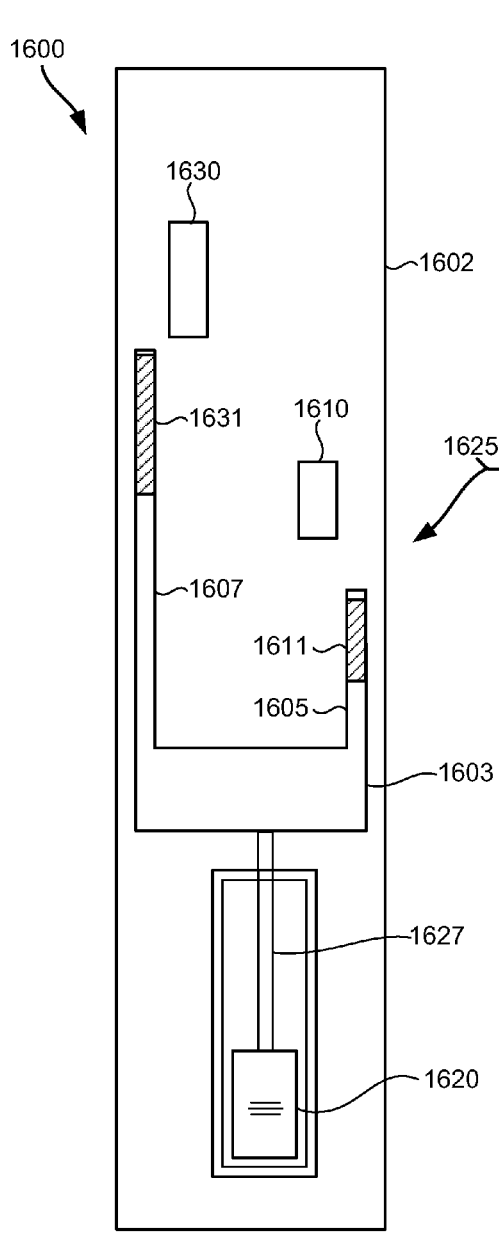
FIGS. 16A and 16B illustrate a shutter mechanism of a mobile communication device according to some embodiments.
Figure 16B:
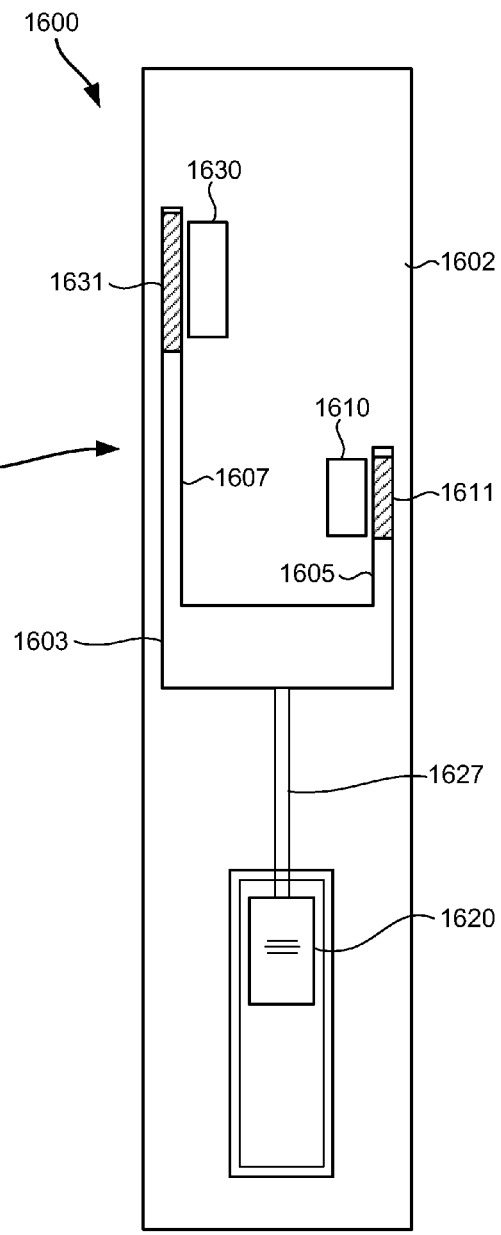

FIGS. 16A and 16B illustrate a shutter mechanism of a mobile communication device according to some embodiments. FIGS. 16A and 16B are top views of a housing 1602 of a mobile communication device 1600. The device 1600 includes a front camera 1610 and a rear camera 1630 respectively disposed within the housing 1602. A privacy mode switch 1620 is situated on an external surface of the housing 1602, such as on the top side edge of the device housing 1602. The switch 1620 includes a connecting member 1627 that mechanically couples the switch 1620 to a shutter mechanism 1625 situated within the housing 1602. The shutter mechanism 1625 is illustrated as a generally U-shaped structure having a base 1603, a first extension 1605, and a second extension 1607. The first extension 1605 includes a first lens shutter 1611 and the second extension 1607 includes a second lens shutter 1631. The first and second lens shutters 1611 and 1631 preferably include opaque or obscuring material and are of a size at least as large as the size of a corresponding lens of the front and rear cameras 1610 and 1630, respectively.

Activation and deactivation of the switch 1620 causes the shutter mechanism 1625 to move into and out of optical engagement with a lens of the cameras 1610 and 1630, respectively. When the shutter mechanism 1625 is activated by moving the switch 1620 as shown in FIG. 16B, the lens shutters 1601 and 1631 cover respective lenses of the front and rear cameras 1610 and 1630. When the shutter mechanism 1625 is deactivated by moving the switch as shown in FIG. 16A, the lens shutters 1601 and 1631 move out of covered alignment with the respective lenses of the front and rear cameras 1610 and 1630. It is understood that actuation of the switch 1620 also causes activation and deactivation of signal diversion activity within the device 1600 in manners previously described.

Figures 17A, 17B:
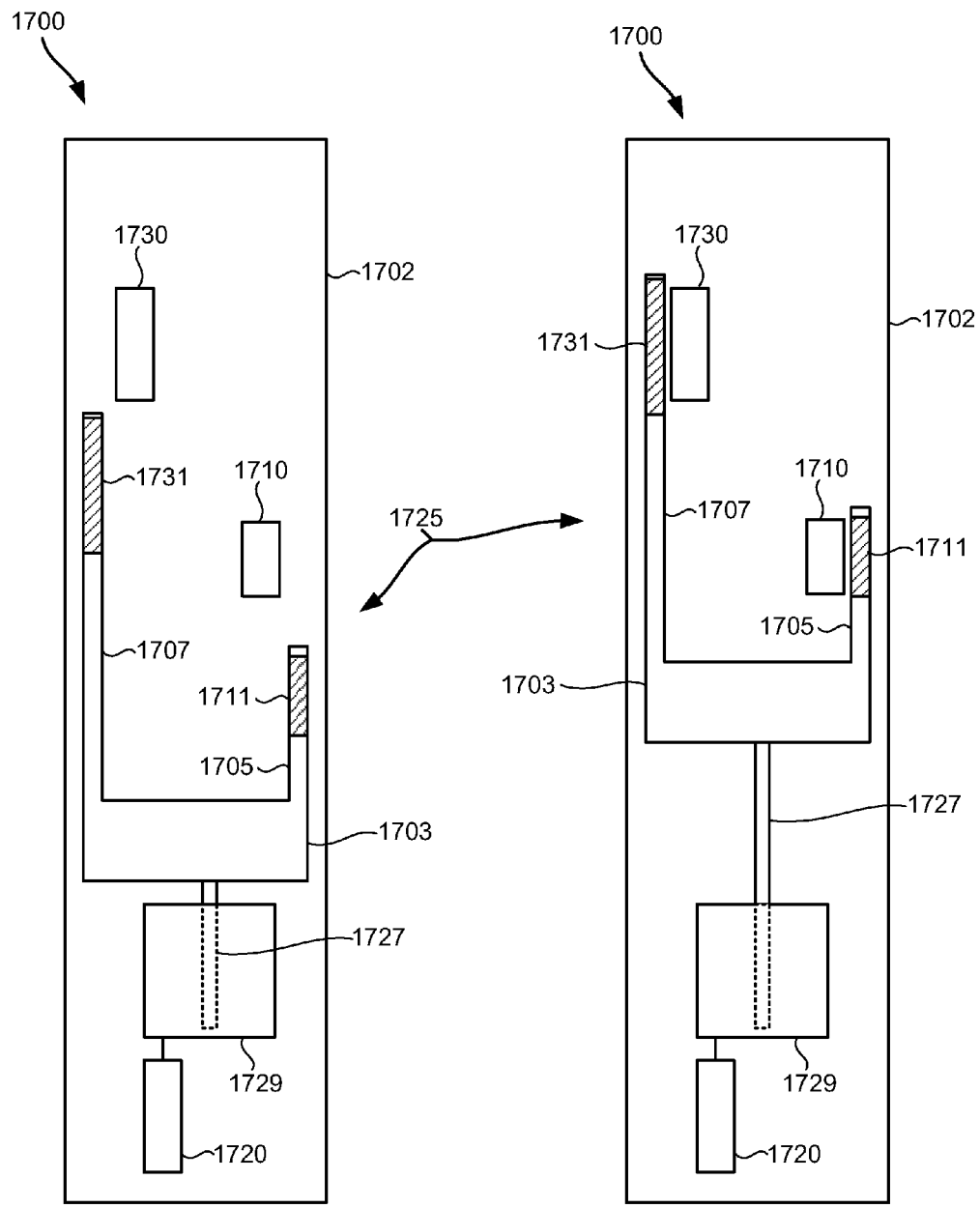
FIGS. 17A and 17B illustrate a shutter mechanism of a mobile communication device according to other embodiments.

FIGS. 17A and 17B illustrate a shutter mechanism of a mobile communication device according to other embodiments. FIGS. 17A and 17B are top views of a housing 1702 of a mobile communication device 1700. The device 1700 includes a front camera 1710 and a rear camera 1730 respectively disposed within the housing 1702. A privacy mode switch 1720 is situated on an external surface of the housing 1702, such as on the top side edge of the device housing 1702. The switch 1720 is coupled to a motor 1729 which is configured to move a shutter mechanism 1725 disposed within the housing 1702 via a connecting member 1727. The switch 1720 is fixedly situated on the housing 1702, in that it is not configured to activate and deactivate a shutter mechanism in response to manual translation of the switch 1720. In the embodiment shown in FIGS. 17A and 17B, user actuation of the switch 1720 causes activation and deactivation of the motor 1729, which respectively engages and disengages a camera shuttering feature of the device 1700.

The shutter mechanism 1725 is illustrated as a generally U-shaped structure having a base 1703, a first extension 1705, and a second extension 1707. The first extension 1705 includes a first lens shutter 1711 and the second extension 1707 includes a second lens shutter 1731. The first and second lens shutters 1711 and 1731 preferably include opaque or obscuring material and are of a size at least as large as the size of a corresponding lens of the front and rear cameras 1710 and 1730, respectively. Activation and deactivation of the switch 1720 causes the motor 1729 to move the shutter mechanism 1725 into and out of optical engagement with a lens of the cameras 1710 and 1730, respectively. When the shutter mechanism 1725 is activated by moving the switch 1720 as shown in FIG. 17B, the lens shutters 1701 and 1731 cover respective lenses of the front and rear cameras 1710 and 1730. When the shutter mechanism 1725 is deactivated by moving the switch as shown in FIG. 17A, the lens shutters 1701 and 1731 move out of covered alignment with the respective lenses of the front and rear cameras 1710 and 1730. It is understood that actuation of the switch 1720 also causes activation and deactivation of signal diversion activity within the device 1700 in manners previously described.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A mobile communications device, comprising:
   a display;
   a plurality of sources comprising at least one microphone and a plurality of cameras including at least a front camera and a rear camera;
   a wireless communications module;
   a main processor;
   a housing configured for hand-held manipulation and comprising a front surface on which the front camera is situated and a rear surface on which the rear camera is situated; the housing configured to support the display, sources, communications module, and main processor;
   a shutter supported by the housing, the shutter comprising a plurality of lens shutters including a front lens shutter and a rear shutter situated within the housing and configured to obscure a lens of the front camera and a lens of the rear camera when activated, wherein the shutter and the front and rear lens shutters define a unitary structure; and
   a switch actuatable by a user of the device and coupled to at least the sources, main processor, and the shutter, the switch configured to activate and deactivate the front and rear lens shutters, divert signals produced by the sources away from the main processor when the switch is activated, and couple signals produced by the sources to the main processor when the switch is deactivated.

2. The device of claim 1, wherein the switch is configured to activate the shutter and divert signals produced by the sources away from the main processor in response to selection of an idle privacy mode.

3. The device of claim 1, wherein each of the front and rear lens shutters comprises an opaque coating or material.

4. The device of claim 1, wherein each of the front and rear lens shutters comprises an electro-optical element.

5. The device of claim 1, wherein at least a portion of the shutter comprising the front and rear lens shutters is movable within the housing between an engaged position and a non-engaged position relative to the lenses of the front and rear cameras.

6. The device of claim 5, wherein:
   the switch is configured for movement between an activation position and a deactivation position in response to a manually applied force;
   the switch is coupled to at least the portion of the shutter comprising the front and rear lens shutters; and
   at least the portion of the shutter comprising the front and rear lens shutters is movable between the engaged and non-engaged positions in response to the manual force applied to the switch.

7. The device of claim 1, wherein the switch is configured to:
when activated, activate the front and rear lens shutters and divert signals produced by the sources away from the main processor and to a termination load or an open circuit; and
when deactivated, deactivate the front and rear lens shutters and couple signals produced by the sources away from the termination load or the open circuit and to the main processor.

8. The device of claim 1, comprising:
one or more sensors;
wherein the switch is configured to:
divert signals produced by the one or more sensors away from the main processor and to a termination load or an open circuit when activated; and
couple signals produced by the one or more sensors away from the termination load or the open circuit and to the main processor when deactivated.

9. The device of claim 1, wherein the device is a mobile phone, a tablet or a laptop.

10. A mobile communications device, comprising:
a display;
a plurality of sources comprising at least one microphone and a plurality of cameras including at least a front camera and a rear camera;
a wireless communications module;
a main processor;
a secured processor inaccessible by the main processor;
a housing configured for hand-held manipulation and comprising a front surface on which the front camera is situated and a rear surface on which the rear camera is situated; the housing configured to support the display, sources, communications module, main processor, and secured processor;
a shutter supported by the housing, the shutter comprising a plurality of lens shutters including a front lens shutter and a rear shutter situated within the housing and configured to obscure a lens of the front camera and a lens of the rear camera when activated; and
a switch actuatable by a user of the device and coupled to at least the sources, main processor, secured processor, and the shutter, the switch configured for user-actuation of a normal operation state and a plurality of privacy operation states, wherein:
in the normal operation state, signals produced by the sources are directed to the main processor and the front and rear lens shutters are deactivated;
in a first privacy operation state, signals produced by the sources are directed to termination transmission paths and the front and rear lens shutters are activated; and
in a second privacy operation state, signals produced by the sources are directed to the secured processor and the front and rear lens shutters are deactivated.

11. The device of claim 10, wherein:
in a third privacy operation state, signals produced by the sources other than the plurality of cameras are directed to the secured processor;
signals produced by the plurality of cameras are directed to termination transmission paths; and
the plurality of shutters are activated.

12. The device of claim 10, wherein each of the lens shutters comprises an opaque coating or material.

13. The device of claim 10, wherein each of the lens shutters comprises an electro-optical element.

14. The device of claim 10, wherein at least a portion of the shutter comprising the lens shutters is movable within the housing between an engaged position and a non-engaged position relative to the lenses of the cameras.

15. The device of claim 14, wherein:
the switch is configured for movement between an activation position and a deactivation position in response to a manually applied force;
the switch is coupled to at least the portion of the shutter comprising the lens shutters; and
at least the portion of the shutter comprising the lens shutters is movable between the engaged and non-engaged positions in response to the manual force applied to the switch.

16. The device of claim 10, wherein the shutter and the lens shutters define a unitary structure.

17. The device of claim 10, wherein the switch is configured to:
in the second privacy operation state, divert signals produced by the sources away from the main processor and to the secured processor with the shutter in a non-engaged position;
in the normal operation state, couple signals produced by the sources away from the secured processor and to the main processor with the shutter in a non-engaged position.

18. The device of claim 10, wherein the secured processor is configured to encrypt the source signals and to decrypt signals received from an external location when the switch is in the second privacy operation state.

19. The device of claim 10, comprising:
one or more sensors;
wherein the switch is configured to:
divert signals produced by the one or more sensors away from the main processor when in one of the plurality of privacy operation states; and
couple signals produced by the one or more sensors to the main processor when in the normal operation state.

20. The device of claim 10, wherein the device is a mobile phone, a tablet or a laptop.

* * * * *